United States Patent [19]

Scott

[11] Patent Number: 4,710,922
[45] Date of Patent: Dec. 1, 1987

[54] APPARATUS AND ASSOCIATED METHODS FOR CONVERTING SERIAL DATA PATTERN SIGNALS TRANSMITTED OR SUITABLE FOR TRANSMISSION OVER A HIGH SPEED SYNCHRONOUS SERIAL TRANSMISSION MEDIA, TO PARALLEL PATTERN OUTPUT SIGNALS

[75] Inventor: Paul H. Scott, San Jose, Calif.

[73] Assignee: Advanced Micro Devices, Inc., Sunnyvale, Calif.

[21] Appl. No.: 810,950

[22] Filed: Dec. 18, 1985

[51] Int. Cl.$^4$ .......................... H04J 3/04; H03M 00/00
[52] U.S. Cl. .............................. 370/112; 340/347 DD; 307/243; 328/104
[58] Field of Search ..................... 370/112, 85, 92, 93; 1340/347 M, 347 DD; 375/2.1; 307/243, 244; 328/105, 104

[56] References Cited

U.S. PATENT DOCUMENTS

| 3,946,379 | 3/1976 | Lippman | 340/347 DD |
| 4,079,372 | 3/1978 | Koenig | 340/347 DD |
| 4,143,246 | 3/1979 | Smith | 370/112 |
| 4,393,301 | 7/1983 | Svendsen | 377/56 |
| 4,523,310 | 6/1985 | Brown et al. | 370/112 |

*Primary Examiner*—Douglas W. Olms
*Assistant Examiner*—Frank M. Scutch, III
*Attorney, Agent, or Firm*—Patrick T. King; Joseph J. Kaliko; J. Vincent Tortolano

[57] ABSTRACT

Apparatus and associated methods are disclosed for converting serial data pattern signals, transmitted or suitable for transmission over a high speed synchronous serial transmission media, to parallel data pattern output signals. The disclosed devices are modular, may each be packaged as a single semiconductor integrated circuit device and are cascadable. When cascaded, the devices are capable of generating parallel data pattern output signals to one or more data sinks from a single serial bit stream.

26 Claims, 24 Drawing Figures

APPARATUS AND ASSOCIATED METHODS FOR CONVERTING SERIAL DATA PATTERN SIGNALS TRANSMITTED OR SUITABLE FOR TRANSMISSION OVER A HIGH SPEED SYNCHRONOUS SERIAL TRANSMISSION MEDIA, TO PARALLEL PATTERN OUTPUT SIGNALS

BACKGROUND OF THE INVENTION

1. Field of the Invention

The present invention relates generally to electronic components and systems for receiving data, and more particularly relates to systems and components which convert serial data pattern signals, transmitted or suitable for transmission over a high-speed synchronous serial transmission media to parallel pattern output signals.

2. Description of the Related Art

Many devices, including standard telecommunication interface devices such as universal asynchronous receiver transmitters (UARTs) and modems, employ asynchronous parallel input/output (I/O) criteria to simplify their internal architecture and permit high speed operation. It is often necessary to transfer or transmit parallel I/O to, from and/or between such devices. One method in current use is to employ parallel cable as the transmission media, where each conductor of the cable is dedicated to one of the parallel inputs or outputs. This arrangement has proven to be unsatisfactory, particularly as line length and number of inputs and outputs increases because of wiring interconnect hardware requirements increased conductor count, increased cost and poor reliability.

Furthermore, parallel format message traffic and control information travelling between host systems (e.g. between two microprocessors) typically each occupy individual conductors of a parallel cable even though this nonhomogeneous type of parallel data run at different data rates. This further increases hardware requirements which has a negative impact on both reliability and cost.

It has been recognized that multiplexing nonhomogeneous parallel data and converting the multiplexed data to serial format for transmission over a single serial interface is desirable to reduce the aforementioned problems and allow for greater distances between communication nodes.

Devices are known and in use which permit asynchronous parallel I/O to be interfaced with a serial communications link. The known methods and apparatus fall into two broad categories, those using asynchronous serial interfaces and those using synchronous serial interfaces.

The asynchronous serial interfaces are difficult to work with because each byte of data communicated over the media must be resynchronized, limiting maximum data rate. Existing synchronous serial interfaces, for example, on Universal Synchronous Asynchronous Receiver Transmitters (USARTs), are problematic because they require synchronizing data. This data can be supplied by a host system or the interface device, and is usually specified by an interface protocol. This represents an added constraint when designing a parallel/serial interface rendering the interface "nontransparent" to the designer.

In addition to the aforementioned problems the multiplexing and demultiplexing of nonhomogeneous parallel data for serial transmission is typically performed external to an interface device. These external processes further increase system complexity, cost and nontransparency by virtue, of the need to insert additional hardware between the host system and the interface device. Further complications in known systems which multiplex data sources from several sending systems over the same wire (typical in tri-state bus architectures in computer systems) are the need for bus controller/arbitrators, software resources, and line drivers that can be switched on and off.

Finally, many commercially available UARTs, USARTs, modems, etc. have eight bit data inputs and outputs. It is sometimes desirable to transmit and/or receive longer data patterns which then require either special purpose hardware or the sending of several "words" to pass the pattern.

SUMMARY OF THE INVENTION

In order to overcome the problems encountered in the prior art a receiver device is disclosed which, according to the preferred embodiment of the invention, is a single semiconductor integrated circuit device that accepts serial data pattern signals suitable for transmission or transmitted over a high-speed synchronous serial transmission media, and internally, automatically demultiplexes and then outputs parallel data pattern output signals. The serial signals, when used to represent nonhomogeneous variable width parallel data input signals, may be converted to parallel pattern output signals which correspond to said input signals. The receiver is further operative to identify output data by type.

The receiver chips are modular and are cascadable. When cascaded, the devices are capable of generating parallel data pattern output signals to a plurality of data sinks from a single serial bit stream. No bus controller arbitrators, software or switchable line drivers are required. Additionally, the receiver device automatically synchronizes itself without system intervention. In fact, the disclosed receiver device is virtually transparent to the user.

It is a primary object of the invention to provide a receiver device which, in a manner transparent to the user, is capable of receiving serial data patterns over a synchronous serial link and internally demultiplexes the data and generates as output parallel data patterns represented by said serial data patterns, identified by type.

It is a further object of the invention to provide a system comprised of modular receiver devices which may be cascaded and are capable of generating parallel output signals one or more of said data sinks from a single serial bit stream.

Other objects, features and advantages of the present invention will become apparent upon consideration of the following detailed description and the accompanying drawings, in which like reference designations represent like features throughout the figures.

The detailed description of the receiver system and components as set forth hereinafter is in the context of an overall system for both transmitting and receiving data, where the utility of the instant invention is demonstrated. This overall system is believed to be novel in and of itself and is often referred to as the "invention" and "novel system", etc. in the text that follows. For the sake of clarity it should be understood that the instant invention is taught and can best be appreciated with specific reference to the structure, content and operation of the receiver portion of the overall system disclosed.

DETAILED DESCRIPTION OF THE INVENTION

Reference is made now in detail to a specific embodiment of the present invention, which illustrates the best mode presently contemplated by the inventor for practicing the invention. Alternative embodiments are also briefly described as applicable.

Figure 1:
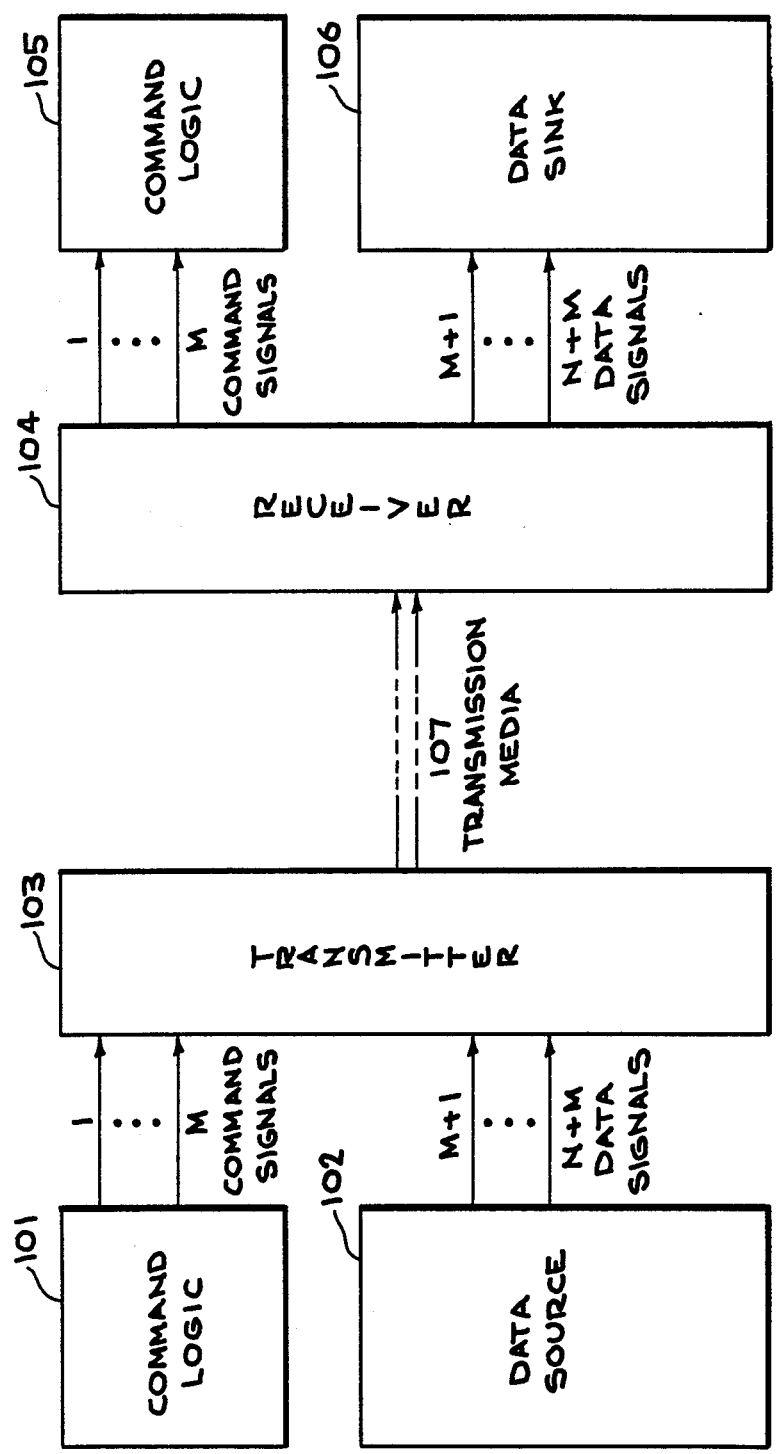
FIG. 1 is a block diagram depicting a data source coupled to a data sink utilizing the present invention.

FIG. 1 is a block diagram depicting a data source coupled to a data sink utilizing the present invention. Two types of signals are represented as being output from a host system which, according to the example depicted, includes command logic and a data source represented by blocks 101 and 102 respectively. These parts of the host system are assumed to output signals asynchronously and the signals are assumed to be non-homogeneous. For example, control signals, hereinafter referred to as "COMMAND" data, could be output from the command logic at one rate, while message traffic, hereinafter referred to as "DATA" data, could output from the data source at another rate. The host system itself could be a microcomputer, telecommunications interface device, etc. and is significant for the purpose of this disclosure only to the extent that it represents a means for outputting and/or receiving the asynchronous nonhomogeneous parallel format data that is input to and output from the system.

The block diagram in FIG. 1, depicts M parallel outputs from the command logic block 101 and N additional outputs from data source 102. According to the preferred embodiment of the invention, N+M is set at 12, where N can be 8, 9 or 10 bits of DATA and M is 4, 3 or 2 bits of COMMAND respectively. The choice of possible values for DATA was made because standard communications systems conventionally utilize 8 bit bytes (or ultiples thereof) for data, with 1 or 2 parity or control bits. The command set employed in the preferred embodiment of the invention requires only 2 to 4 bits to specify all legal commands. It will become obvious to those skilled in the art that M, N and the choice of M+N equalling 12 are arbitrary values which support the preferred embodiment herein, but which could be different without departing from the scope and spirit of the invention.

The M+N signals in FIG. 1 are shown input in parallel to a transmitter device 103. It will be shown that the data width of the asynchronous input is variable and can be selected by the user from the 8, 9 or 10 bits which the preferred embodiment permits.

Transmitter 103 and receiver 104, coupled by synchronous serial transmission media 107, depict one generalized aspect of the novel system which will be described in detail hereinafter. It will be shown that the system may comprise one or more transmitters and one or more receivers, operating in various modes and utilizing one or more serial links. For now, suffice it to say that transmitter 103 performs the parallel to serial conversion required to use synchronous link 107 and receiver 104 reverses the process performing serial to parallel conversion for the data shown in FIG. 1.

Finally, FIG. 1 depicts the M COMMAND signals and N DATA signals output from receiver 104 in the same parallel format they were input to transmitter 103, with the output being identified by type and routed to command logic 105 and data sink 106, as appropriate.

In order to better understand how the disclosed system operates a detailed description of a transmitter suitable to serve as transmitter 103 will first be set forth. This description will include preferred packaging arrangements for and a detailed functional description of the transmitter, a description of its' various operating modes and possible configurations in the system, and a presentation of timing diagrams to visualize data flow through the transmitter with a time orientation.

Following the description of the transmitter, a receiver suitable to serve as receiver 104 will be described in a like manner.

The description of the transmitter and receiver taken together will completely describe the operation of the novel system.

1. THE TRANSMITTER

Figure 2:
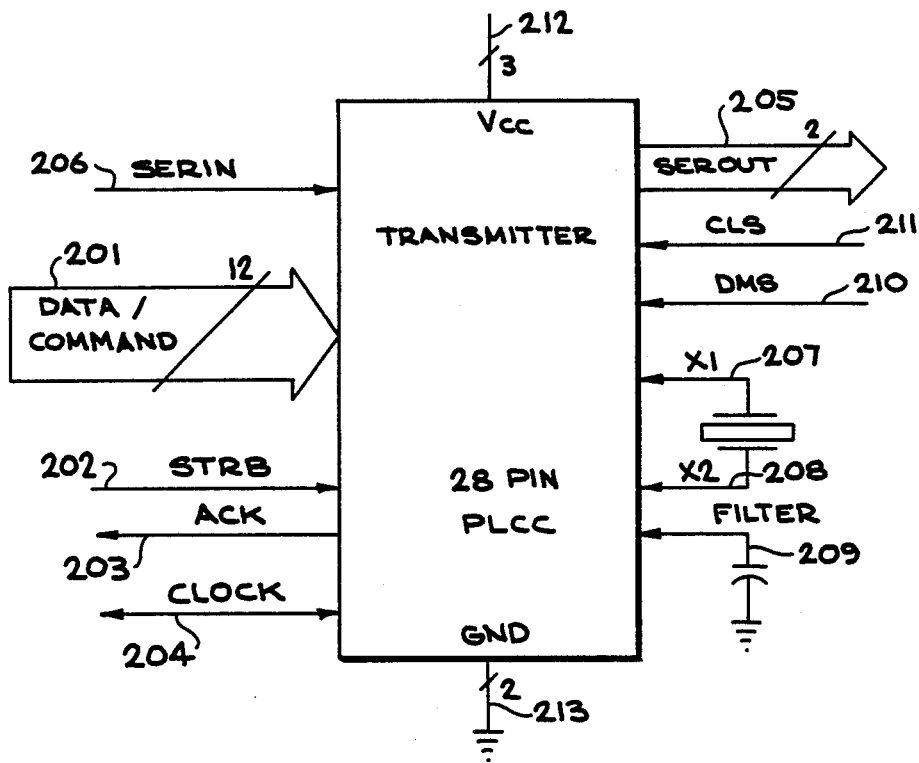
FIG. 2 is a pin diagram of a transmitter chip packaged in accordance with the preferred embodiment of the invention.

FIG. 2 depicts a pin diagram for a transmitter chip packaged in accordance with the preferred embodiment of the invention. The package of choice is a 28 pin plastic leaded chip carrier (FLCC) since it will occupy the smallest space on a user's PC board and cost the least. It will be obvious to those skilled in the art that the package of choice, number of pins, etc. may be varied to suit the desired application of the disclosed system.

Depicted in FIG. 2 are 12 DATA/COMMAND Inputs, shown as the 12 line input, 201. These are the twelve signals from the host system which according to the preferred embodiment, can be 8, 9 or 10 bits of DATA and 4, 3 or 2 bits of COMMAND information, respectively. Also shown in FIG. 2 are 1 strobe (STRB) input, 202; 1 ACK output, 203; 1 CLOCK input/output, 204; 2 differential serial ECL outputs; shown as output 205; serial ECL input, 206; 2 crystal (XTAL) pins, 207 and 208; 1 filter pin, 209; 1 data mode select (DMS) input, 210; 1 cascade/local mode select (CLS) input, 211; 3 VCC pins, shown as 212; and 2 ground pins, shown as 213; for a total of 28 pins. The purpose of the inputs and outputs will be examined with reference to FIG. 3 which depicts the logic symbol used subsequently in the Drawing to depict transmitter 103 when packaged as shown in FIG. 2.

Figure 3:
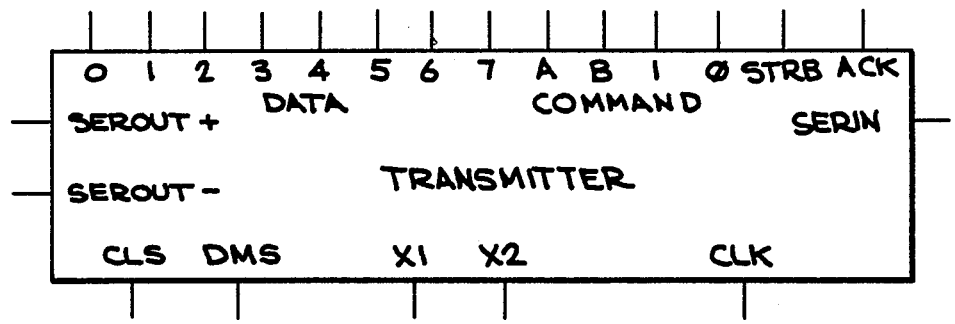
FIG. 3 is the logic symbol for the transmitter packaged as shown in FIG. 2 and is the symbol utilized in subsequent portions of the Drawing to represent a transmitter chip which functions in accordance with the teachings herein.

DATA pins 0 through 7 of FIG. 3 accept parallel message traffic (DATA) from the host system. Transmitter 103 will latch, encode and transmit these inputs in a manner to be described hereinafter.

Pin A of FIG. 3 will either be a DATA or COMMAND input depending on the state of the data mode select pin, shown as the "DMS" pin in FIG. 3. The purpose and various states of the DMS pin will be described hereinafter with reference to FIG. 3. Pin B will also either be a DATA or COMMAND input depending on the state of the DMS pin.

COMMAND Pins 1 and 0 of FIG. 3 accept parallel COMMAND information from the host system.

DATA can be either 8, 9 or 10 bits in width depending on whether or not pins A and/or B serve as COMMAND or DATA inputs. Likewise, and consequently, COMMANDs will be either 4, 3 or 2 bits in width.

By convention, COMMAND data will be latched, encoded and transmitted by transmitter 103 in place of any pattern on the DATA inputs, i.e. COMMAND data is defined to have a higher priority then DATA data. A "null" command, for example all command bits low, may be used to signal automatic switching by transmitter 103 to accept the DATA input patterns.

The strobe input, shown as STRB in FIG. 3, is defined in the preferred embodiment of the invention to be the signal which causes the DATA or COMMAND input presented to transmitter 103, to be latched into the transmitter. By choice it will be assumed that the rising edge of an input strobe signal causes the appropriate inputs to be latched into transmitter 103. The manner in which STRB initiates the latching process will be described in detail hereinafter with reference to FIG. 7.

According to the preferred embodiment of the invention all of the aforementioned inputs to transmitter 103 are TTL compatible.

FIG. 3 also depicts an output pin labled ACK (for "acknowledge"). This output is chosen to rise, after the input DATA or COMMAND has been accepted by an input latch located the transmitter chip, following the rising edge of a strobe input. ACK will rise when the input latch contains the input data. It will be seen, in conjunction with the functional description of transmitter 103 and the description of FIG. 7, that ACK may be delayed if the strobe input is asserted a second time before the data first put into the input latch has had a chance to be transferred out for further processing in the transmitter. The ACK output also designed to fall in response to a low on the strobe input. According to the preferred embodiment of the invention, the ACK output is TTL compatible.

FIG. 3 also depicts a TTL compatible bidirectional clock pin. According to the preferred embodiment of the invention, this I/O pin supplies the clock reference to drive internal logic and provides synchronization when transmitters like transmitter 103 are cascaded together.

At this juncture several basic definitions will be made which will be helpful in understanding how the transmitter operates.

As used in this section describing the transmitter the terms "upstream" and "downstream" refer to the relationship of two serially connected transmitters and their proximity to the serial transmission media. An upstream transmitter is defined as being further from the transmission media then its downstream neighbor.

The terms "LOCAL" mode and "CASCADE" mode when referring a transmitter, indicate its' two possible operating modes.

In LOCAL mode a transmitter is directly coupled to the serial transmission media. This mode is most useful when a transmitter is being employed to capture a data pattern one pattern wide and send it over a private serial link.

In CASCADE mode two or more transmitters are involved. One transmitter operates in LOCAL while the other transmitter (or transmitters), said to be operating in CASCADE mode, are serially linked to and are upstream from the LOCAL mode transmitter. The CASCADE mode is most useful to permit the capture and transfer of data patterns that are many patterns wide which ultimately are to be transmitted over a single shared serial link.

Returning now to the description of the CLOCK pin. The pin is enabled as an output when the transmitter is in LOCAL mode. The output serves as a free running clock operating at the frequency of an on chip crystal oscillator. In CASCADE mode the CLOCK pin output is disabled and the pin acts as an input only.

The signals on CLOCK are used as a reference to an internal, i.e. on chip, phase locked loop (PLL) multiplier, and, as hereinbefore indicated, may be used as the synchronizing reference for cascaded transmitters. A master counter, which serves as an internal state machine for the transmitter, is synchronized to the falling edge of the clock signal. The operation and function of the master counter will be described hereinafter as part of the functional description of the transmitter's clock generator and as part of the description of FIG. 8.

FIG. 3 depicts a SERIN pin, which, according to the preferred embodiment of the invention, serves to accept serial data input. This is chosen to be an ECL compatible input which accepts ECL voltage swings referenced to +5.0 V. This pin is directly coupled to any upstream transmitter's SEROUT+ output pin (to be described hereinafter with reference to FIG. 3) and when no upstream transmitter exists, no input is received on the SERIN pin.

Two of the output pins shown in FIG. 3 are labled SEROUT+ and SEROUT−. These pins output differential serial data. These differential ECL outputs generate data at ECL voltage levels referenced to +5.0 V. According to the preferred embodiment of the invention, the outputs are capable of driving 50 ohm terminated lines, through isolating capacitors. As indicated hereinbefore, SEROUT+ is coupled to the SERIN pin of any downstream transmitter, and when no downstream transmitter exists, SEROUT+ and SEROUT− are coupled to a synchronous serial transmission media, such as media 107 shown in FIG. 1.

FIG. 3 depicts four more pins; X1, X2, DMS and CLS, which are "nonlogic" pins. X1 and X2 are the XTAL input pins, connected to the on chip oscillator which oscillates at the fundamental frequency of a parallel resonant crystal, shown connected to pins X1 and X2 in FIG. 2.

According to an alternate embodiment of the invention, X1 may also be driven by an external frequency source.

The DMS pin, as indicated hereinbefore, may be used to select the DATA pattern width, which consequently determines the COMMAND pattern width. According to the preferred embodiment of the invention, when DMS is wired to ground (GND), the transmitter will assume DATA to be eight (8) bits wide, with four (4) bits of COMMAND. When DMS is wired to VCC, DATA is assumed to be nine (9) bits wide and COMMAND three (3) bits wide. If DMS is left floating (or terminated to ½ VCC), DATA will be assumed to be ten (10) bits wide, with two (2) bits of COMMAND.

Thus, DMS may be wired by the user of the system to accomodate the variable widths of DATA that the transmitter can process.

The last non logic pin, the CASCADE/LOCAL select (CLS) pin, is utilized to select the transmitter mode of operation. When wired to VCC, the transmitter will assume it is cascaded and has a downstream neighbor. In this mode, the transmitter will function to output Non Return to Zero (NRZ) data and the source of the clock will be an external source assumed to be another transmitter.

By convention, and without limiting the scope of the invention, transmitters will generate NRZ data on their SEROUT+ and SEROUT− outputs and accept NRZ data on their SERIN pins except for transmitters operating in LOCAL mode. In LOCAL mode, transmitters output Non Return to Zero Invert on Ones (NRZI) data to comply with encoding conventions adopted for the transmission of data over the serial link. These conventions are discussed in detail hereinafter.

When CLS is wired to GND, the transmitter will assume it is directly coupled to the transmission media (LOCAL mode).

Finally, when CLS floats, the transmitter enters a test mode. According to the preferred embodiment of the invention the internal circuitry of the transmitter may be tested in this mode, with the on chip clock multiplier switched out and with the internal logic being clocked directly from X1.

Not shown in FIG. 3, but referred to in FIG. 2, are the three connections to VCC, two connections to GND and a filter pin.

The VCC connections are, TTL VCC which supplies current to the TTL I/O circuits, ECL VCC which supplies current to the ECL output circuits and CML VCC which supplies current to all the internal logic and analog circuits. TTL VCC, ECL VCC and CML VCC are all isolated from one another to reduce internal noise coupling, but will, according to the preferred embodiment of the invention, be connected to a common external 5 V. supply.

The GND connections are, TTL GND, used by the TTL I/O circuits and CML GND, which is used by all internal logic and analog circuits. These two grounds are separated to reduce internal noise coupling, but, according to the preferred embodiment of the invention, are connected to a common external ground reference.

The filter pin, which is shown in FIG. 2, may be used to allow a low-pass filter to be added to the on chip PLL frequency multiplier. Such a filter could consist of a relatively noncritical capacitor to ground.

A functional description of transmitter 103 will now be presented with reference to FIGS. 4, 5, 6, 7, 8 and 9 as appropriate.

Figure 4:
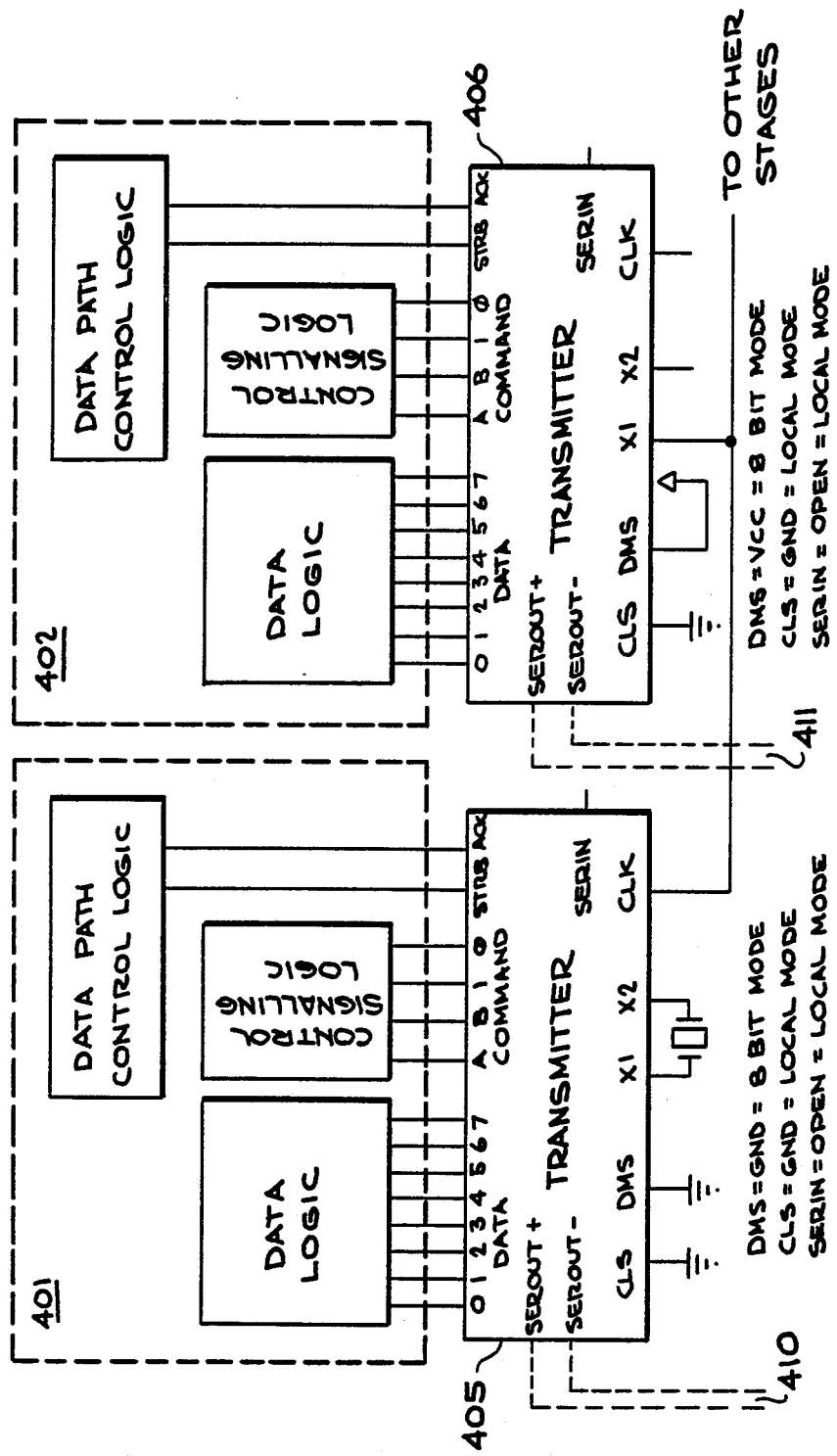
FIG. 4 is an illustration of the disclosed transmitter in one of its two operating modes, the "LOCAL" mode.

FIG. 4 depicts an example of two transmitters, each interposed between a host system and a private serial link, where each transmitter is set up to operate in LOCAL mode.

Figure 5:
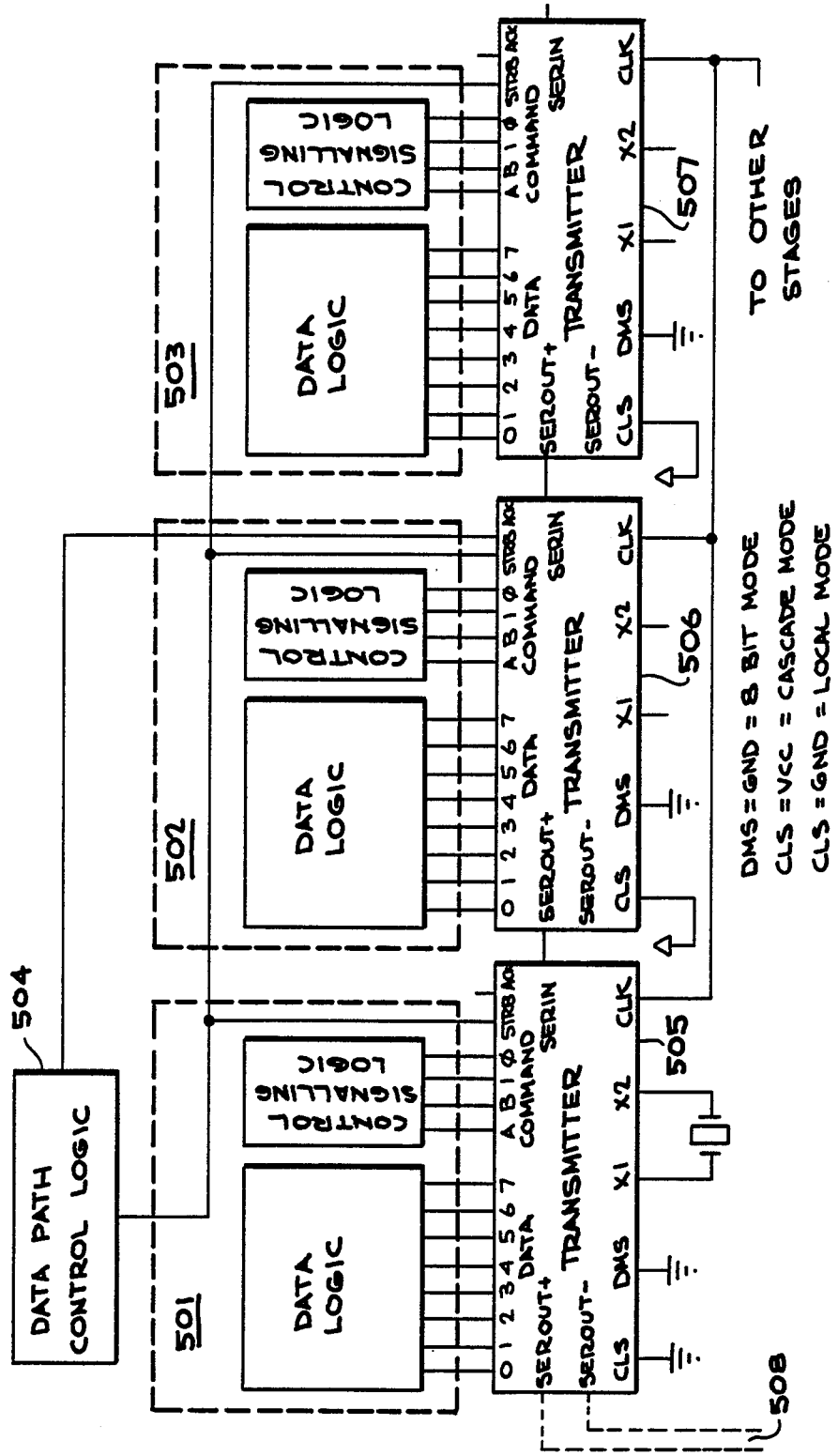
FIG. 5 is an illustration of the disclosed transmitter in one of its two operating modes, the "CASCADE" mode.

FIG. 5 depicts an example of cascaded transmitters which field a wide data pattern and share a single serial link.

Figure 6:
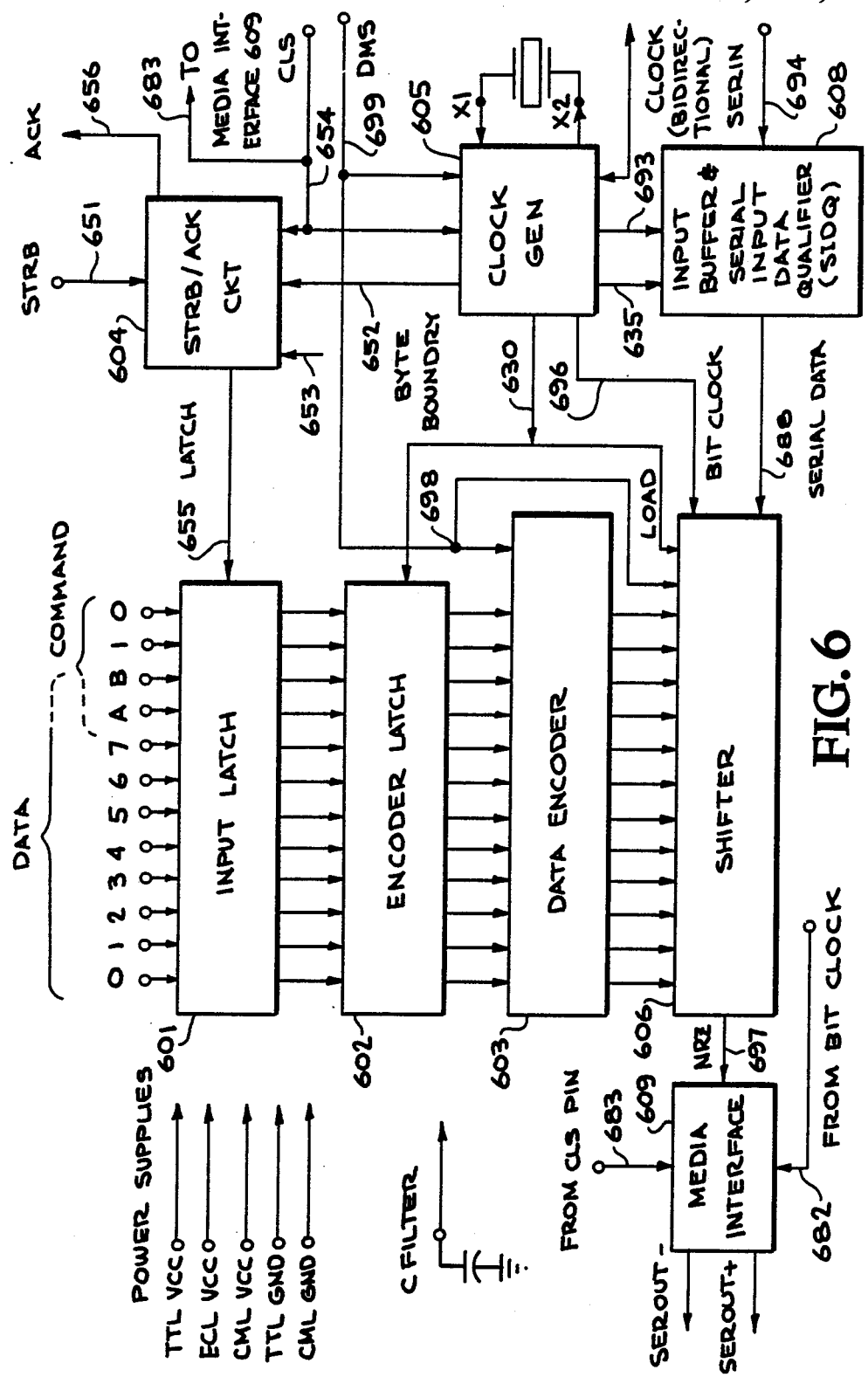
FIG. 6 is a functional block diagram of the integrated circuit on the transmitter chip the pin diagram of which is shown in FIG. 2.

FIG. 6 depicts a functional block diagram of the integrated circuit on transmitter chip 103, showing the same inputs and outputs as shown in the pin diagram of FIG. 3.

Figure 7:
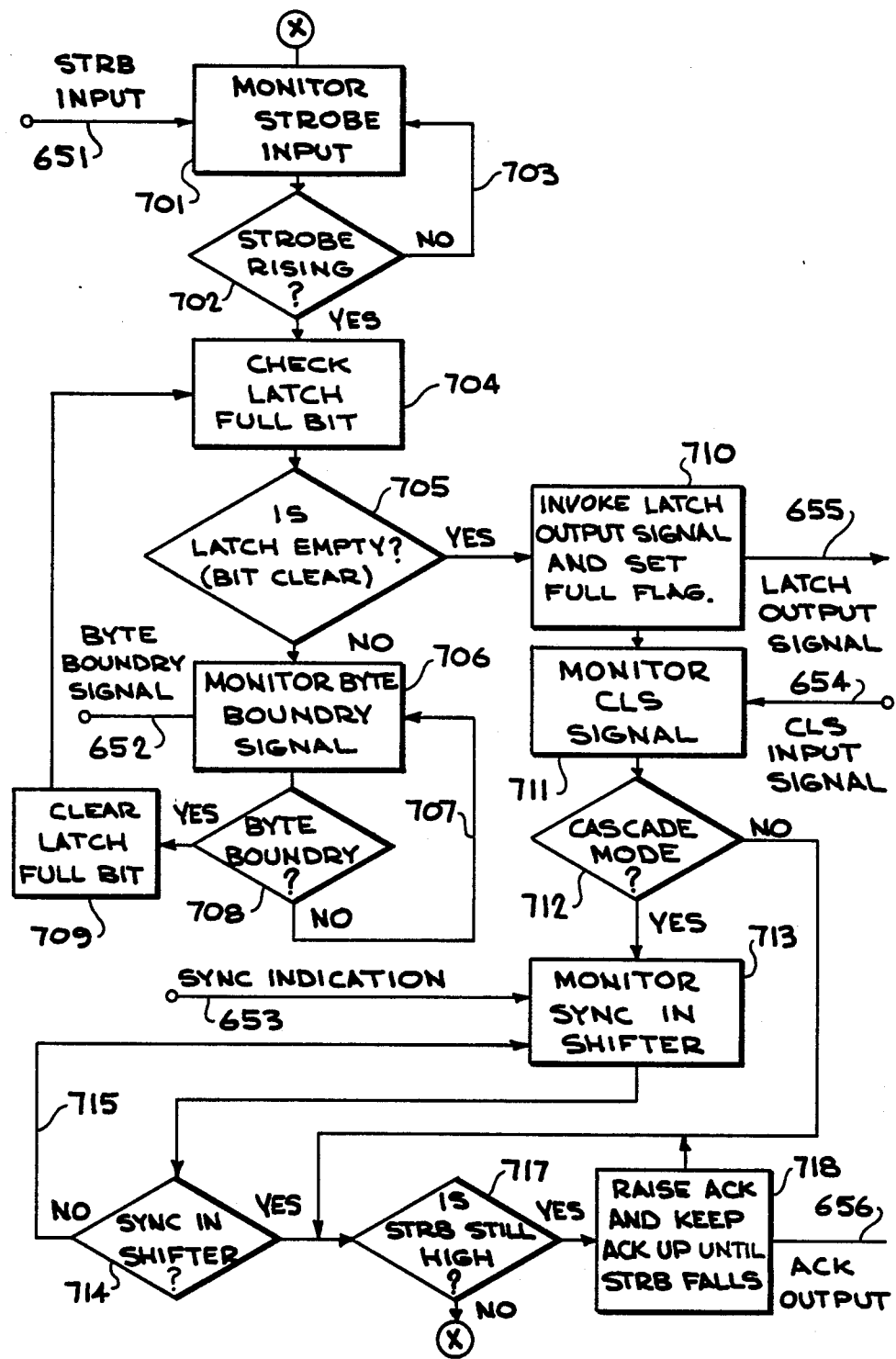
FIG. 7 is a flowchart detailing the functions performed by the strobe and acknowledge circuit shown in FIG. 6.
Figure 8:
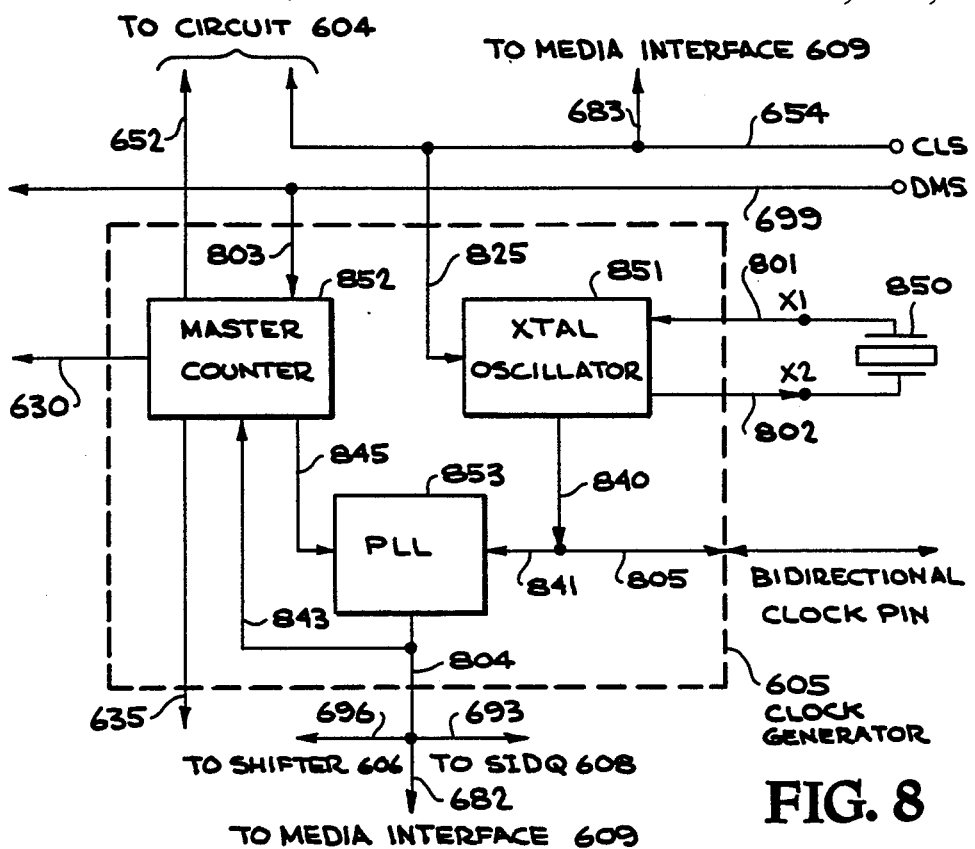
FIG. 8 is a more detailed block diagram of the Clock Generator shown in FIG. 6.
Figure 9:
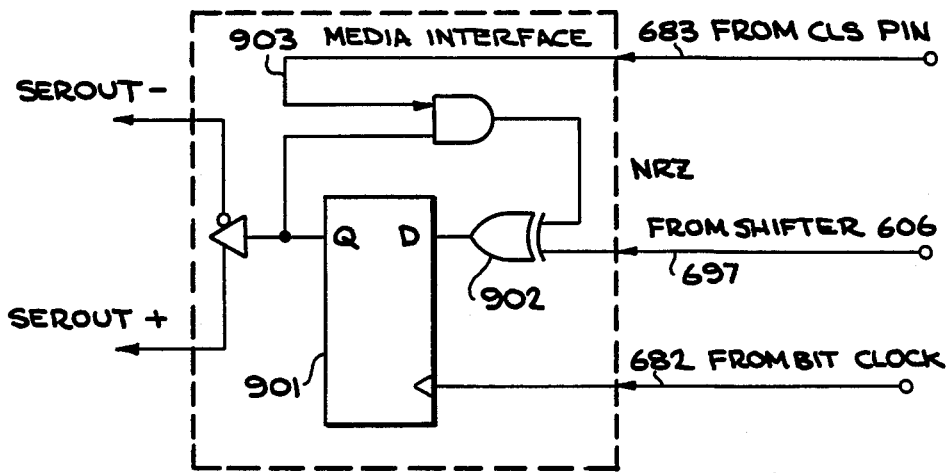
FIG. 9 is a schematic of the media interface circuit shown in FIG. 6.

FIGS. 7, 8 and 9 aid in the description of portions of FIG. 6.

It may be seen with reference to FIG. 4 that two host systems are depicted, system 401 and system 402, each of which provide inputs to transmitter 405 and 406 respectively. Host system 401 is shown as inputting 8 bits of DATA to transmitter 405 and the DMS pin of transmitter 405 is shown equal to GND, signifying the 8 bit mode. It should be observed that the COMMAND inputs are 4 bits wide in this case. It should be further noted that neither of transmitter 405 and 406 have an input on their SERIN pins, and that the CLS pin on both transmitters are grounded, signifying LOCAL mode operation. Note that both transmitters are directly coupled to separate, private, serial links 410 and 411, i.e. both transmitters are indeed in LOCAL mode.

It should also be observed that the DMS pin of transmitter 406 is connected to VCC indicating transmitter 406 is to accept 9 bits of DATA and 3 bits of COM- MAND from host system 402, which indeed is shown to be the case.

It should also be observed that separate data path control logic, shown as a part of each host system, is coupled to the STRB and ACK pins of transmitters 405 and 406. This logic, which does not constitute part of the present invention, function to (a) signal a transmitter, via sending a strobe signal on STRB, when an input is being presented on the DATA/COMMAND pins, and (b) to receive an acknowledgment on ACK when the input has been accepted by the transmitter. The manner in which a transmitter responds to a strobe signal, along with how and when an output on ACK is generated, is described in detail herein with reference to FIG. 7.

Finally, it should be observed that the CLOCK pin of transmitter 405 is enabled as an output (since CLS is low) and is used in the depicted example to not only drive transmitter 405, but also drive transmitter 406 via its X1 pin.

It may be seen with reference to FIG. 5 that host systems, 501, 502 and 503, (all of which are shown sharing common data path control logic 504), are set up to separately input 8 bits of DATA and 4 bits of COMMAND to each of transmitters 505 506 and 507, in parallel. Transmitter 505, 506 and 507 all have common STRB inputs, i.e. the data is indeed input to the transmitters three patterns wide.

The single ACK output from transmitter 506 to data path control logic 504 is used to signal the host system that all cascaded data (i.e. all three patterns in this case) have propagated down through the serially linked transmitters and that new data may be accepted without overwriting previously input information. The manner by which ACK is output, i.e. is caused to rise at the appropriate time, is described in detail herein with reference to FIG. 7.

It may be observed that the LOCAL mode transmitter, the one closest to serial link 508, has its CLS pin grounded, while the upstream transmitters have CLS connected to VCC signifying they are indeed operating in CASCADE mode.

It may also be seen that the SERIN pin of transmitter 505 receives input from the SEROUT+ pin of transmitter 506 and that transmitter 506 in turn receives serial input on its SERIN pin from the SEROUT+ pin of transmitter 507. No input is received on the SERIN pin of transmitter 507.

The SEROUT+ and SEROUT− outputs of transmitter 505 are shown coupled to serial transmission media 508, while the CLOCK output of transmitter 505 (output exists since CLS is low) drives transmitters 506 and 507 in synchronization via their respective CLOCK input pins. Finally, a crystal is shown connected to X1 and X2 of transmitter 505 for providing the fundamental frequency to a clock generator (described with reference to FIG. 8) on board transmitter 505.

A detailed functional description of the transmitter with reference to FIG. 6 will permit the tracing of an arbitrary DATA/COMMAND input through a given transmitter in its various operating modes. However, before proceeding with this detailed functional description, a brief overall description of a transmitter's function will be set forth together with a discussion of several assumptions made and conventions adopted in accordance with the preferred embodiment of the invention.

The basic function of each transmitter is to encode, serialize and shift out data that has been placed in its latches. In CASCADE mode the output is to another transmitter. In LOCAL mode the output is to the serial link.

The examples used to explain the functional details of the transmitter assume that a unique data pattern, hereinafter referred to as SYNC, is automatically generated by a transmitter operating in LOCAL mode if no new data is being sent by the host system.

In CASCADE mode all transmitters will send whatever data is on their SERIN pins whenever no new data is to be sent by the host sytems. The exception to this rule is that the transmitter farthest upstream will generate SYNC patterns after its parallel data is sent. It should be recalled that the transmitter farthest upstream does not receive any data on its SERIN pin.

SYNC(s) generated in the CASCADE mode will propagate through all downstream transmitters until shifted out onto the serial link. SYNC generation continues until new data is input to the cascaded transmitters.

The space between transmitted patterns in both LOCAL and CASCADE mode is filled with SYNC patterns to maintain link synchronism and provide pulses to keep receiver PLL circuit, to be described in detail with reference to the description of the receiver, in lock.

The SYNC pattern chosen in accordance with the preferred embodiment of the invention will have a Zero DC offset in order to keep AGCed Fiber Optic Transceiver circuits in their normal range. This is an important feature when it is desired that the serial link operate at speeds high enough to require a fiber optic transmission media.

The SYNC pattern is also chosen so that its pattern never occurs in the normal data stream. This feature allows SYNC to be used to set and monitor symbol boundries.

The preferred manner in which SYNC patterns are generated will be explained with reference to the description of input buffer serial input data qualifier (SIDQ) 608 shown in FIG. 6.

Two conventions adopted in the preferred embodiment need be discussed at this point. First, minimum spacing requirements on strobe inputs which, it will be recalled, signal data is ready to be input to a transmitters input latch. Second, the data encoding scheme used in the preferred embodiment of the invention.

With respect to spacing requirements, a cascaded system needs only take care not to strobe the transmitters until after all data has had time to propagate down the whole chain. This is because, by convention, an input on STRB causes parallel data to be latched, encoded, and loaded into a transmitter's shifter regardless of what data is input at the SERIN pins. The only time that SERIN data is shifted through the transmitters is when there is no new data in the parallel path. This puts a minimum pulse space requirement on STRB inputs. The minimum spacing is equal to the number of DATA patterns in the cascaded chain, plus one (to allow a minimum of one SYNC between cascaded data strings). An exception to this convention occurs when using the autorepeat feature of CASCADE mode. When this feature is used, multiple wide data patterns are output over the serial link abutting one another, without interspacing the wide patterns with SYNCs.

In asynchronous systems, the ACK line can be used to determine the minimum strobe spacing. When a transmitter has serial data input on its SERIN input, it will delay the ACK output response to a STRB input until SYNC is detected in the shifter. This delayed ACK can be used to enable/trigger a new STRB. The method for detecting SYNC and controlling the ACK output will be explained with reference to the flowchart set forth in FIG. 7.

In an alternate application of the invention, where the host system is synchronous and is synchronized to the transmitter sending rate, the spacing between STRBs can be determined by a counter in the sending logic.

With respect to encoding conventions, the preferred code used by the transmitters to encode parallel data into serial data must insure that there are an adequate number of 'flux changes' in any data pattern so that the receiver synchronizer PLL, to be described in detail with respect to the receiver hereinafter, is able to maintain sync. This implies a maximum time between transitions. The ANSI X3T9.5 (FDDI) committee has chosen a code with a maximum of three consecutive non-transition bit times. The preferred embodiment of the invention incorporates this coding convention, however no intent to limit the scope of the invention is intended by this choice.

The FDDI code assumes that a "ONE" is represented by a transition, and a "ZERO" is represented by no transition. This is Non Return to Zero, Invert on ones, or "NRZI" code. In this system a "1" can be a transition high-low or a transition low-high, and a "0" can be a static high or a static low. Again, the preferred embodiment of the invention will use the same convention.

The code is chosen so that symbol patterns will have the same average amount of "HIGH" time as "LOW" time. This "DC Balance" is an attempt to minimize the data induced noise effects on an AC coupled system, in which DC shifts can cause errors in data recovery. These errors appear as jitter in the recovered waveform.

The preferred encoder used in the transmitter, shown as 603 in FIG. 6, must encode eight (8), nine (9) or ten (10) bits of data into ten (10), eleven (11) or twelve (12) bit patterns for serial transmission in accordance with the conventions adopted. The encoding can be accomplished using a ROM with a lookup table for data encoded 603.

Other coding conventions than those followed herein to realize the preferred embodiment of the invention, may be adopted without departing from the scope or spirit of the invention. In fact, other coding conventions, SYNC spacing requirements, etc. may be utilized as the application of the system, noise tolerance criteria, acceptable error rate, etc., permit. Various encoding schemes to realize the conventions adopted herein are well known to those skilled in the art, see for example, the ANSI X3T9.5 specification itself. After stepping completely through the functional descriptions of the transmitter and receiver, it will be clear to those skilled in the art that the disclosed system is indeed code independent.

Turning now to the detailed discussion of FIG. 6. DATA/COMMAND data is shown input to DATA pins 0-7; pin A, pin B and COMMAND pins 1 and 0. For the sake of illustration only, assume 8 bits of DATA and 4 bits of COMMAND data are presented by the host system. In this case the DMS pin would be grounded; DATA will appear at data pins 0-7; and COMMANDs will appear on pins A and B, and command pins 1 and 0.

Data is clocked into parallel input latch 601 by an external strobe signal being applied to the STRB pin. As indicated with reference to FIGS. 4 and 5, this is a function that may be accomplished by data path control logic, of the type shown in those figures as part of the host system, when the host system is prepared to present data to a transmitter.

The STRB/ACK circuit, depicted in FIG. 6 as 604, takes as inputs: (1) the two state strobe signal on lead 651 from the host system; (2) an indication on lead 652, from clock generator 605 which itself will be described in detail hereinafter, of a time oriented "byte boundry" having been reached. (Byte boundries occur at 10, 11 or 12 bit intervals, depending on the selected data mode and system operating frequency); (3) an input from shifter 606 on lead 653 indicating whether or not a SYNC pattern is in the shifter; and (4) an input on lead 654 as to whether the transmitter is in LOCAL or CASCADE mode.

The outputs of circuit 604 are; (1) a latch signal on lead 655 which permits data presented to the transmitter to be accepted by input latch 601; and (2) a two state acknowledge signal, ACK, to be output on lead 656 in accordance with the flow diagram set out in FIG. 7.

FIG. 7 depicts a flowchart of one method for observing the strobe/acknowledge handshake protocol incorporated in the preferred embodiment of the invention. Other methods and circuits to effect a handshake protocol may occur to those skilled in the art without departing from the scope of the invention.

The inputs to and outputs from the flowchart shown in FIG. 7 are the same as those shown to and from STRB/ACK circuit 604. It will be appreciated by those skilled in the art that the functions called for by the flowchart in FIG. 7 may be realized by standard, off-the shelf, logic components.

The STRB/ACK circuit continuously monitors lead 651 for STRB to rise. This is the indication that the host system is prepared to input data to parallel input latch 601 of FIG. 6. This function is represented in FIG. 7 by boxes 701, 702 and loop 703. The STRB signal is shown input on lead 651 of both FIGS. 6 and 7.

Only if it is determined that STRB is rising, circuit 604 monitors a "latch full bit", as indicated by box 704 of FIG. 7. According to the preferred embodiment of the invention, the latch full bit set indicates data previously put into input latch 601 has not yet been accepted by encoder latch 602. Thus, to allow new data to be input by the host system when this bit is set would cause the data already in input latch 601 to be overwritten. By convention, the latch full bit is cleared at each byte boundary whether or not STRB has risen.

Decision box 705 tests the monitored latch full bit. If the latch full bit is set (i.e. the input latch is not empty), the byte boundry signal input by the clock generator on lead 652 is monitored (box 706). The transmitter is set up to transfer data from the input latch to the encoder latch at a byte boundary. Loop 707 is entered until a byte boundry is reached as determined by decision box 708.

Once a byte boundry is reached, the latch full bit is cleared (box 709), the latch empty determination will be made (boxes 704 and 705) and the latch output signal on lead 655 will be invoked (see box 710). At the same time the latch full bit will be set and stay set until the next byte boundary arrives.

Next, the selected mode of the transmitter is monitored (box 711) by checking the input on the CLS pin, carried on lead 654. Decision box 712 checks if the mode is CASCADE or not (i.e., LOCAL). It should be recalled that in CASCADE mode one of the transmitters is designated to supply the ACK signal (see FIG. 5) since in the CASCADE mode ACK cannot be raised until all data has had a chance to propagate through the cascaded transmitters. For example, a SYNC in the cascaded transmitter closest to the one operating in LOCAL mode will indicate that new data can be accepted (i.e. it would be an appropriate time for a STRB) without causing any data overwrite. If CASCADE mode is detected by circuit 604, then, for the reasons stated above, boxes 713 and 714 must monitor lead 653 for the SYNC indication. This is accomplished via loop 715. Obviously, if the ACK output of a cascaded transmitter is not being used, this portion of the circuitry is not controlling a message back to the host system and a dectected SYNC in shifter 606 is meaningless.

If the transmitter is operating in LOCAL mode, no SYNC detection (path 716) is required (only one pattern width of data is sent) to prevent overwrites. Overwrites are protected against by monitoring the latch full bit as previously explained.

Finally, since STRB may arbitrarily be taken down (low) by the host system at any time, a test must be made for STRB still high before raising ACK in response to a detection of SYNC in CASCADE mode, or the latch bit being clear in LOCAL mode.

This is performed as indicated by test box 717. If STRB was in fact previously taken down by the host system, circuit 604 returns to looking for a STRB input. If STRB is still high, ACK is raised and output on lead 656 (as shown by box 718), and kept up until STRB falls, whereupon ACK is taken down as well.

Reference is now made to FIG. 8 for a description of clock generator 605 shown in FIG. 6.

Clock generator 605 is shown in FIG. 8 to include a XTAL oscillator, 851; a master counter, 852; and a PLL, 853.

The possible inputs to clock generator 605 are (1) from crystal 850 externally connected to pins X1 and X2 (the crystal could be replaced in an alternate embodiment by and external frequency source connected to X1 in LOCAL mode); (2) from the CLS pin to XTAL oscillator 851 via lead 825; (3) from the DMS pin to master counter 852 via leads 699 and 803; and (4) from an external clock or other frequency source over bidirectional lead 805 when the transmitter is operating in the CASCADE mode. It should be noted that FIG. 8 shows XTAL oscillator 851 coupled to pins X1 and X2 via leads 801 and 802.

The CLS input to XTAL oscillator 851 over lead 825 is used to switch the XTAL oscillator off in CASCADE mode (when input is taken via lead 805 from an external source) and on in LOCAL mode (where input via lead 805 is inhibited).

The possible outputs of clock generator 605 are (1) pulses from PLL 853 running at the bit clock rate on output lead 804; (this output will be utilized by shifter 606, SIDQ 608, and media interface circuit 609, all shown in FIG. 6); (2) a byte boundary signal on output lead 652 from master counter 852, to be utilized by STRB/ACK circuit 604; in the manner described hereinbefore with reference to FIG. 7; (3) clock pulses over lead 805 to the bidirectional clock pin when the transmitter is in LOCAL mode; (4) a "load" signal output from master counter 852, on lead 630, which is used to load encoder latch 602 and shifter 606 at byte boundaries; and (5) a signal from the master counter to SIDQ 608, over lead 635, indicating each successive master counter state as it counts bit times from byte boundary to byte boundary. The purpose of this last signal will be explained with reference to the operation of SIDQ 608 which is set forth hereinafter.

FIG. 8 also shows the internal connections within clock generator 605. XTAL oscillator 851 is connected to PLL 853 via leads 840 and 841; PLL 853 is connected to master counter 852 via lead 804 and 843; and master counter 852 feeds back to PLL 853 via lead 845.

Clock generator 605 is further operative as follows: The serial link speed is derived from a master frequency source which, as explained hereinbefore, can either be built in XTAL oscillator 851, or a clock signal applied through pin X1. This signal is buffered to the CLOCK pin output when the transmitter is in LOCAL mode.

In CASCADE mode, the CLOCK pin output is disabled (to eliminate signal contention) and CLOCK pin input is always taken from the external signal (to eliminate clock skew caused by external loading effects). Again, in CASCADE mode XTAL oscillator 851 is switched off.

The CLOCK input is multipled by ten (8 bit mode), eleven (9 bit mode), or twelve (10 bit mode), using PLL 853. PLL 853 obtains its input for the clock pin in all modes.

The absolute range of allowable frequencies must be determined by the user, but it should, in accordance with the preferred embodiment of the invention, be possible to vary the chosen working frequency over a three to one range.

The crystal frequency required to achieve, for example, 125 mBit/sec. on the serial link, and the resultant useable data transfer rate, will be;

| MODE | XTAL freq | Input pattern rate | Internal Divide Ratio |
|---|---|---|---|
| 8 Bit | 12.50 mHz | 80 nS/pattern (100 mBit/sec) | 125/10 |
| 9 Bit | 11.36 mHz | 88 nS/pattern (102 mBit/sec) | 125/11 |
| 10 Bit | 10.42 mHz | 96 nS/pattern (104 mBit/sec) | 125/12 |

It should be noted that the useable data rate will be slightly lower than the numbers above would indicate, since there is a requirement to insert SYNC symbols to maintain data integrity. The reduction in rate will be application specific, and will generally be a very small percentage reduction.

It should also be noted that the bit rate used in the above example is for the sake of illustration only and is arbitrary.

The output of PLL 853 (i.e. the multiplied clock input) is the bit clock. These pulses are output on lead 804 as explained above, and are also used to advance master counter 852 after each bit interval. The DMS input to master counter 852 controls the divide ratio and in turn the feedback to PLL 853 on lead 845.

Finally, as explained hereinbefore, the master counter sends byte boundary signals and state information to various parts of the transmitter as previously specified.

All the components of clock generator 605, except for

PLL 853, may be fabricated from standard off-the-shelf components well known to those skilled in the art. An acceptable crystal oscillator is the Motorola MC-12061. The master counter can be fabricated using a conventional high speed binary counter.

The PLL used in accordance with the preferred embodiment of the invention uses all off-the-shelf components except for two components which are the subject of two issued U.S. Patents.

The first patent is U.S. Pat. No. 4,565,976, issued Jan. 21, 1986. It was assigned to the assignee of this invention and is hereby incorporated herein by reference. This first patent teaches a master/slave oscillator arrangement where the master contains the center frequency and the slave tracks minor frequency oscillations. This feature is optional for the purposes of the current disclosure.

The second patent is U.S. Pat. No. 4,628,461, issued Dec. 9, 1986. It is also assigned to the assignee of this invention and is hereby incorporated herein by reference. The second patent describes a PLL with a phase detector that ignores missing pulses. This feature is regarded as optional for the purposes of the current disclosure as it relates to the transmitter.

Having explained how clock signals, bit clocks, state information and byte boundary information are provided by clock generator 605, it can now be appreciated how data flows through the transmitter depicted in FIG. 6.

Recall that data is clocked into input latch 601 by external STRB signal. If the latches are empty, data is clocked on the rising edge of STRB. However, if the latches have not had time to be transferred to encoder latch 602 then the transfer will be delayed. Recall also, that the ACK output signal on lead 656 indicates a successful transfer.

After the data has been latched in input latch 601, encoder latch 602 is enabled to and in fact does, accept the data inputs at the next byte boundary. Recall the byte boundary will be signalled by a "load" signal on lead 630. At the same time that newly input data is transferred from latch 601 to latch 602 the load signal on lead 630 causes the transfer of newly encoded data from encoder 603 into shifter 606. In accordance with the preferred embodiment of the invention, although not shown in FIG. 6, the most significant encoded data bit in encoder 603 is actually sent directly to the media interface. Additionally, the input to encoder latch 602 will be synchronous with a byte being sent on the serial link.

It should be recalled that input latch 601 is considered empty after the transfer of data to encoder latch 602, and that input latch 601 will then accept new data as explained hereinbefore with reference to FIG. 7.

As for data encoder 603, it operates to encode the 12 data inputs (8, 9, 10 DATA bits and 4, 3, 2 COMMAND inputs) into 10, 11, or 12 bits using the coding conventions discussed hereinbefore. The COMMAND data inputs control the transmitted symbol. Recall that if all COMMAND inputs are low then the byte for the DATA bits will be sent. If COMMAND inputs have any other pattern then the byte representing that COMMAND will be transmitted. It should also be observed with reference to FIG. 6 that the DMS input is provided to encoder 603 via lead 699, to specify the selected data width.

At this point it should be apparent to those skilled in the art that input latch 601, encoder latch 602 and data encoder 603 are all realizable using standard off-the-shelf components. The latches can be 74LS374s. As previously indicated data encoder 603 could be a ROM with a look up table.

The portions of the transmitter that remain to be described in detail are shifter 606, SIDQ 608 and media interface 609.

It should be recalled that newly encoded data from data encoder 603 is caused to be loaded into shifter 606 when a load signal appears on lead 630. In effect, the shifter is parallel loaded from the encoder at the first available byte boundary and then shifted until the next byte boundary. The shifter is actually being serially loaded at all times, but if a parallel load is invoked, it overwrites the serial data before it appears at media interface 609.

The serial data which is loaded into the shifter will come from one of two sources. If the transmitter is receiving 'good' data at its SERIN input, then the serial data will come from the external serial input. If the transmitter is not receiving 'good' data (good data according to the preferred embodiment is defined never to have five consecutive 0's), then the serial data will be generated by an internal state machine which generates a repeating SYNC pattern.

The details of how this is performed will be set forth with reference to the description of SIDQ 608.

Shifter 606 is prepared to accept the proper number of data bits, based on the pattern width specified by the user. This input which appears at the DMS input pin is coupled to shifter 606 via leads 699 and 698.

Finally, with reference to FIG. 6, shifter 606 can be seen to output NRZ data on lead 697, one bit at a time, as nudged by the bit clock on lead 696. Lead 696 is assumed to tap PLL 853 output lead 804 (see FIG. 8).

Shifter 606 may be realized by utilizing an AM8177 video shift register manufactured by Advanced Micro Devices, Inc.

SIDQ 608 is simply a level restoring buffer in CASCADE mode. In LOCAL mode this logic contains a small state machine which generates the SYNC symbol to pad the spaces between user data patterns.

SIDQ 608 is either passing user data (including SYNC) received on link 694 from the SERIN pin (i.e. data from an upstream neighbor), or is generating SYNC upon the recognition of bad (5 zero) data. Bad data is generated when the transmitter has no upstream neighbor or, for example, during the power up phase of the system when an upstream neighbor is off frequency.

Data is clocked bit by bit through SIDQ 608 and onto link 688 with reference to the bit clock input on lead 693, which like lead 696 is also assumed to tap PLL 853 output lead 804.

SYNC is generated during the byte following the recognition of bad data, beginning at the next byte boundary as referenced by signals from master clock 852 sent on lead 635. If the transmitter has an upstream neighbor and good data is reacquired, the good data will begin to be output to shifter 606 during the next byte time frame.

According to the preferred embodiment of the invention the master clock input could be used to build the SYNC pattern bit by bit. SIDQ 608 could be a ROM with a look up table or a PAL. A simple counter arrangement to keep track of the number of consecutive zeros detected in the bit stream, and a flag to cause a switch between internal SYNC generation or external data pass through, can be used to realize the other described functions of SIDQ 608.

The final block in transmitter 103 is media interface 609.

Reference is made to FIG. 9 which depicts a logic diagram for realizing the media interface. The purpose of the interface is to take NRZ data as input, and output NRZ over SEROUT+ and SEROUT−, unless the transmitter is in LOCAL mode. In LOCAL mode, the transmission media is presumed to be coupled to the transmitter and NRZI data, as explained hereinbefore, is to be sent.

One can readily appreciate with reference to FIG. 9 that with each bit clock pulse to flip-flop 901, NRZ data supplied on lead 902 will be converted to NRZI when the CLS input on lead 903 is low (LOCAL mode). When lead 903 is high (CASCADE mode), NRZ data is output by media interface 609.

Figure 10:
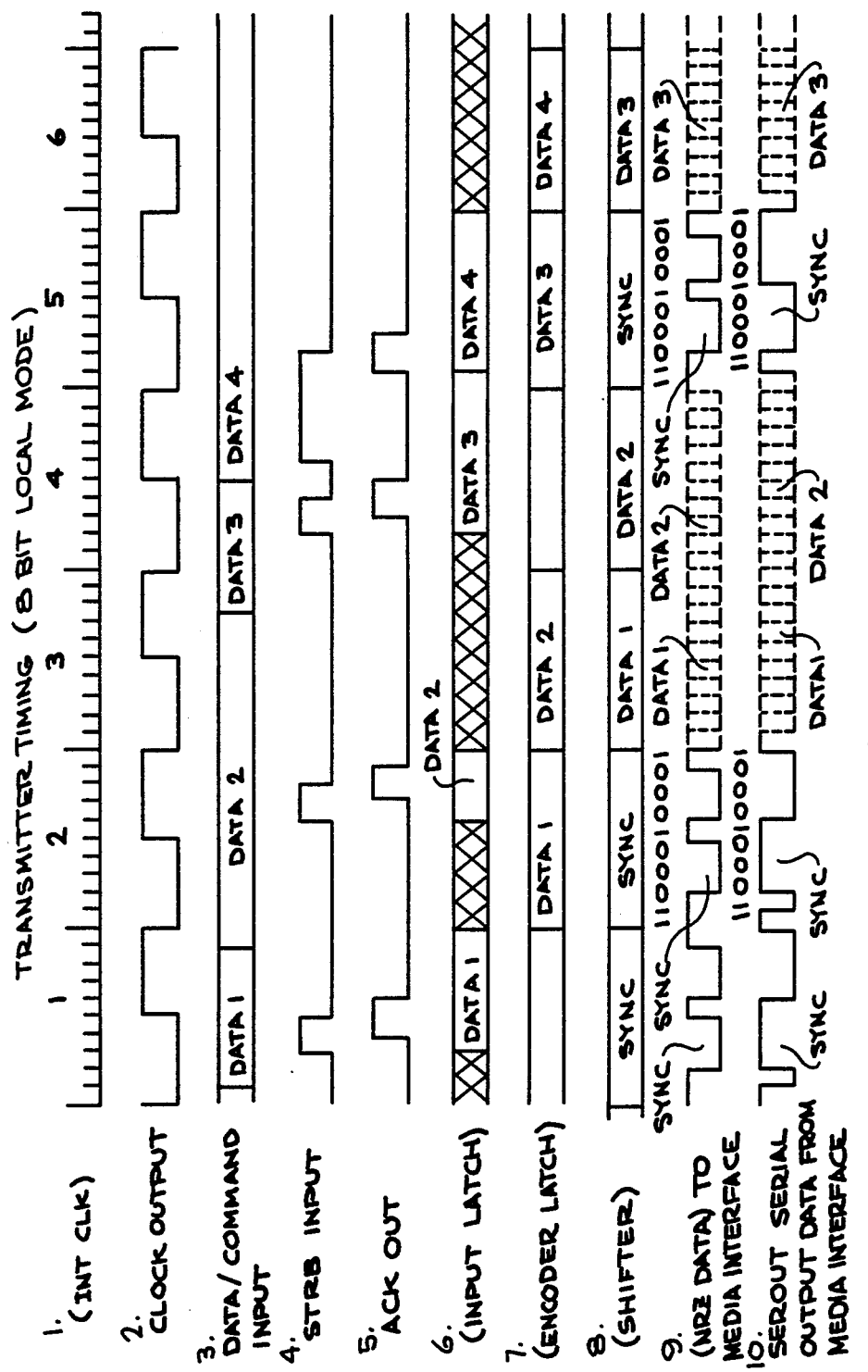
FIG. 10 is a timing diagram depicting the operation of an 8 bit transmitter of a system, built and operated in accordance with the teachings herein, operating in LOCAL mode.
Figure 11:
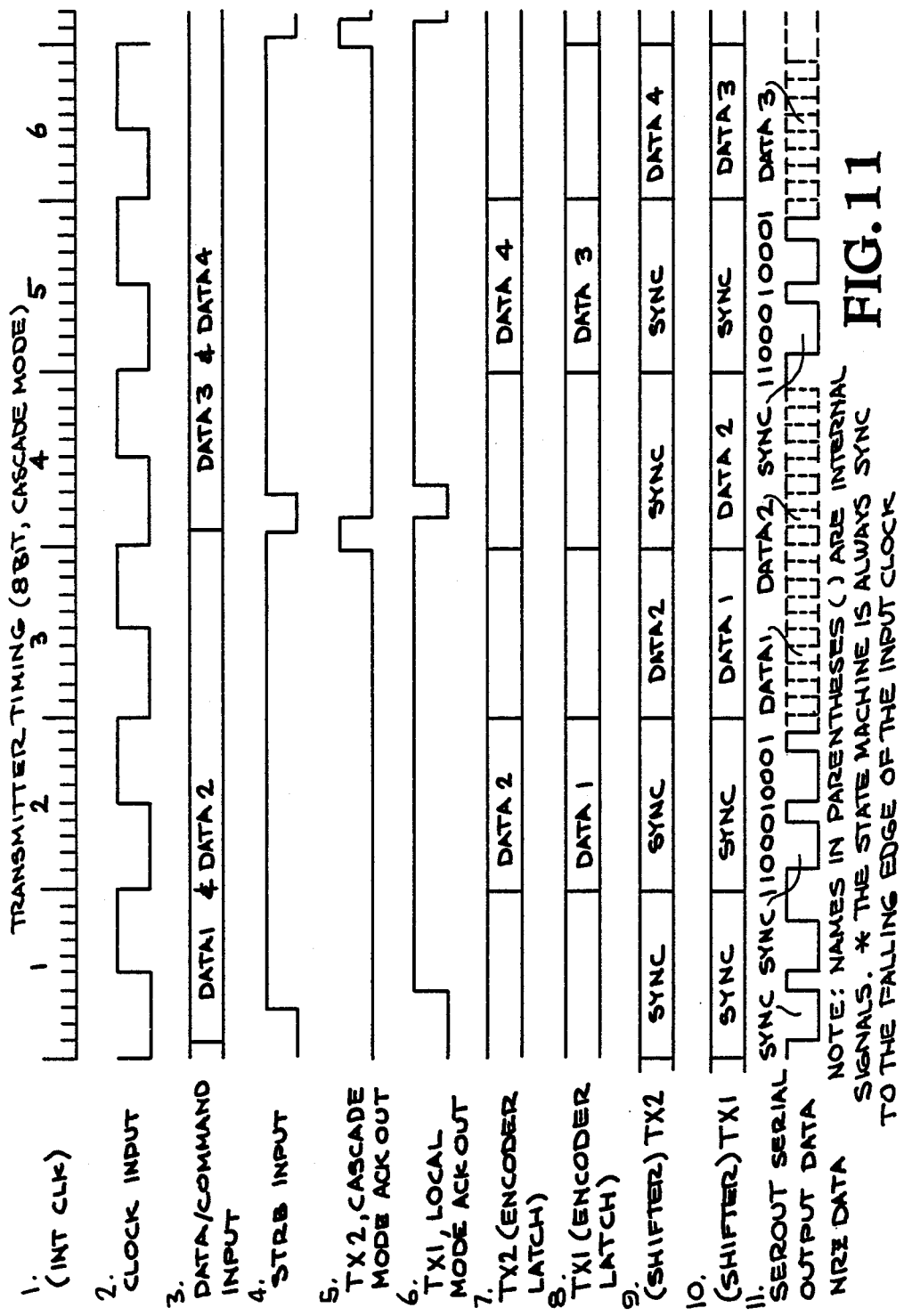
FIG. 11 is a timing diagram depicting the operation of an 8 bit transmitter of a system, built and operated in accordance with the teachings herein, operating in CASCADE mode.

Having completely followed the path of asynchronous nonhomogeneous variable width parallel data input to a transmitter built in accordance with the teachings of the invention, a recap of how the transmitter functions may be had with reference to FIGS. 10 and 11.

FIG. 10 is a transmitter timing diagram for a transmitter operating in LOCAL mode. The host system is presenting 8 bit wide data patterns.

The diagram illustrates how the STRB/ACK handshake works in general and particularly illustrates a situation where STRB is asserted a second time before data has had a chance to flow from the input latch to the encoder latch.

The top line of the diagram labled INT CLK (line 1) represents internal transmitter bit clock pulses. Since this is 8 bit mode, a "byte interval" will be 10 bits long. Each byte interval, 1–6 in FIG. 10, is labeled across the top of the figure.

On line 2, labeled CLOCK OUTPUT, the interval between the clock output falling is shown as 10 internal clock periods.

Line 3 of the diagram represents the DATA/COMMAND input being presented to the transmitter by the host system. Four pieces of data are shown presented at various points in time.

Line 4 depicts the STRB pulses coming from the host system. These pulses could conceivably come at any time, and be taken down at any time.

In the first depicted byte interval STRB is asserted, DATA 1 is immediately put in the input latch (see line 6 of FIG. 10) followed by ACK rising. Recall when describing the STRB/ACK circuit, a flag indicates if the input latch is full or empty. The "x's" preceeding DATA 1 on line 6 of FIG. 10 indicate the input latch was empty and DATA 1 could be placed in the latch immediately upon STRB. If the latch had been full, a delay until the next byte boundary (clock falling) would be invoked to protect the data in the input latch until it could be placed in the encoder latch.

Note (line 5) that the first ACK falls in response to STRB falling as described hereinbefore with reference to FIG. 7.

At the end of the first byte interval, DATA 1 is shown to have propagated down to the encoder latch (line 7 of the Drawing). The "X's" on line 6 again indicate the latch full bit (the flag) was cleared at the previous byte boundary.

It can be seen that STRB asserted a second time, this time during the second byte interval, again causes the input data, this time DATA 2, to be placed directly into the input latch. STRB again falls, and so does ACK. At the edge of the second byte interval when the clock falls, DATA 1 is transferred to the shifter (see line 8), and DATA 2 is placed in the encoder latch.

DATA 3 is presented to the transmitter during the third byte interval, but note that it is not strobed into the transmitter until the fourth byte interval. It may be seen that since no new data was presented during byte interval 3 and since the transmitter is not receiving input on its SERIN pin (because it has no upstream neighbor), the SIDQ must pad the "space" with a SYNC to maintain link synchronization.

The SYNC may be seen in the shifter (line 8) during byte interval 5. DATA 1 was shown to reach the shifter during byte interval 3, DATA 2 can be seen in the shifter during byte interval 4 and then comes the SYNC.

The diagram goes on to show the third STRB applied during byte interval 4, causing DATA 3 to be put in the input latch. STRB is shown to be exerted yet again but this time before DATA 3 has had a chance to propagate to the encoder latch. It may be observed that ACK does not rise in response to this fourth STRB until after the next byte boundary, i.e. when DATA 3 has moved to the encoder latch.

As a result of the operation of the STRB/ACK circuitry, DATA 3 may be seen in the encoder latch and DATA 4 in the input latch while the SYNC is in the shifter.

Finally, DATA 3 and DATA 4 in turn find their way into the serial data stream.

Lines 9 and 10 of FIG. 10 depict the NRZ output of the shifter and the NRZI output of the media interface device in this, LOCAL, mode.

FIG. 11 depicts a transmitter timing diagram for two cascaded transmitters, one operating in LOCAL mode and one in CASCADE mode.

Again, for the sake of illustration line 1 shows the internal bit clock pulses (10 per byte for 8 bit mode) and line 2 shows the clock input, the falling edges of which again represent the byte boundaries.

Line 3 depicts two data patterns, each two patterns wide. DATA 1 and DATA 2 comprise one pattern and DATA 3 and DATA 4 comprise the other.

Line 4 shows the STRB pattern and line 5 shows the ACK pattern from the transmitter (TX2) whose ACK output is sent back to the host system and is the controlling ACK signal.

Line 6 shows the ACK pattern of the LOCAL mode transmitter (TX1) wnich does not go back to the host system and merely tracks STRB, i.e. rises after STRB rises and falls after STRB falls.

Lines 7 and 8 show DATA 1 and DATA 2 in the encoder latches of the transmitters to which they were input during byte interval 2. In byte interval 3, DATA 1 and DATA 2 have propagated to their respective shifters.

At the end of byte interval 3, ACK on line 5 first rises, followed by STRB falling and rising again in byte interval 4. The ACK rose because the STRB/ACK circuit of the upstream transmitter saw the SYNC in the transmitter's shifter which, it will be recalled, is the signal to raise ACK (if STRB is still up) in CASCADE mode.

When STRB rose again in byte interval 4, DATA 3 and DATA 4 were put in the input latches of their respective transmitters (not shown) and this data propagates down to the encoder latches in byte interval 5.

Lines 9 and 10 depict the contents of the two shifters during each of the aforesaid byte intervals. Note the second SNYC in the upstream transmitter's shifter is replaced by DATA 3 in the downstream transmitter's serial output stream during byte interval 6.

Finally, line 11 shows the NRZ data as output from the LOCAL mode transmitter's shifter (i.e. before encoding to NRZI by the media interface).

What has been described with reference to FIGS. 2 through 11 is the transmitter portion of the novel system. The receiver will now be described in detail.

2. THE RECEIVER

Figure 12:
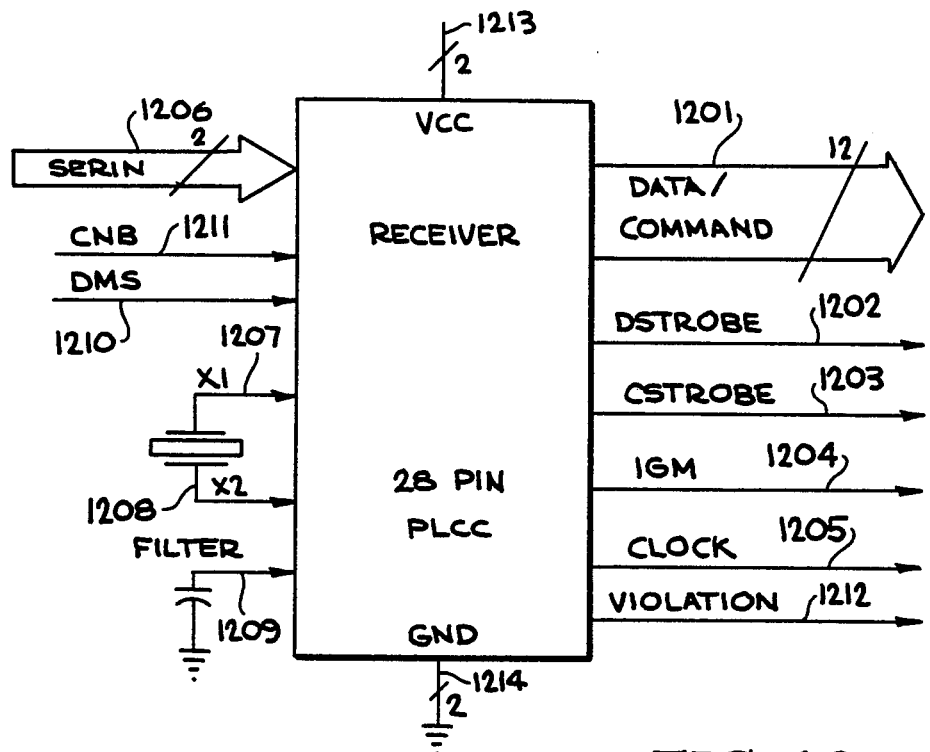
FIG. 12 is a pin diagram of a receiver chip packaged in accordance with the preferred embodiment of the invention.

FIG. 12 depicts a pin diagram for a receiver chip packaged in accordance with the preferred embodiment of the invention. The package of choice is again a 28 pin PLCC.

Depicted in FIG. 12 are 12 DATA/COMMAND outputs, shown as the 12 line output, 1201. These are the twelve signals to the host system which according to the preferred embodiment, can be 8, 9 or 10 bits of DATA and 4, 3 or 2 bits of COMMAND information, respectively. Also shown in FIG. 12 are 1 data strobe (DSTROBE) and 1 command strobe (CSTROBE) output, labeled 1202 and 1203 respectively; 1 "I got mine" (IGM) output, 1204; 1 CLOCK output, 1205; 2 differential serial ECL inputs, shown as input 1206; 2 crystal (XTAL) pins, 1207 and 1208; 1 filter pin, 1209; 1 data mode select (DMS) input, 1210; 1 "catch next byte" (CNB) input, 1211; 1 violation output, 1212; 2 VCC pins, shown as 1213; and 2 ground pins, shown as 1214; for a total of 28 pins. The purpose of the various inputs and outputs will be examined with reference to FIG. 13 which depicts the logic symbol used subsequently in the Drawing to depict receiver 104 when packaged as shown in FIG. 12.

Figure 13:
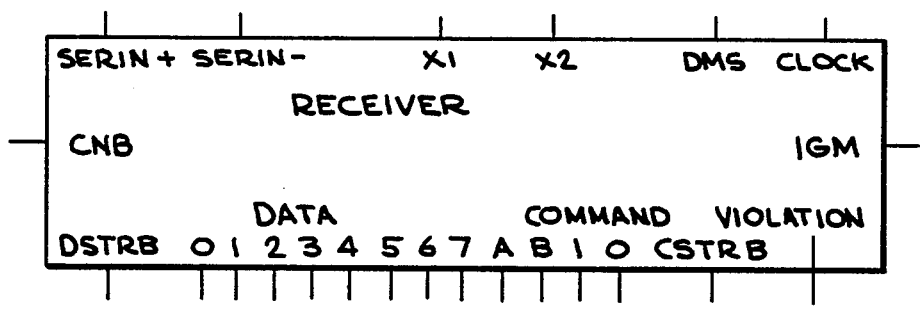
FIG. 13 is the logic symbol for the receiver packaged as shown in FIG. 12 and is the symbol utilized in subsequent portions of the Drawing to represent a receiver chip which functions in accordance with the teachings herein.

DATA pins 0–7; pins A and B; and COMMAND pins 1 and 0 of FIG. 13, correspond to output 1201 of FIG. 12. DATA pins 0–7 output parallel message traffic (DATA) to a receiving host system. These outputs reflect the most recent valid DATA received by a given receiver.

Pin A will either be a parallel DATA or COMMAND output depending on the state of the data mode select pin, shown as the "DMS" pin in FIG. 13. The purpose and various states of the DMS pin are the same with respect to the receiver as described with respect to the transmitter. Pin B will also either be a DATA or COMMAND output depending on the state of the DMS pin.

COMMAND pins 1 and 0 output parallel COMMAND information to the receiving host system. These outputs reflect the most recent valid COMMAND received by a given receiver.

DATA outputs will be either 8, 9 or 10 bits in width depending on whether or not pins A and/or B serve as COMMAND or DATA inputs. Likewise, and consequently, COMMAND outputs will be either 4, 3 or 2 bits in width.

The input to a receiver is assumed to come from two different parts of the sending host system. DATA comes from a normal data channel, and represents message traffic between host systems. COMMAND data comes from a communication control section of the sending host system. This type of data occurs at a relatively infrequent rate, but has a higher priority than message data.

The type of original input signal (COMMAND or DATA) represented by the serial data pattern signal input to the receiver, determines the path for the correspnding parallel signal output by the receiver. Thus, the receiver may be said to determine the proper routing for its parallel output signals based on the destination oriented content of the received serial data pattern signals.

The receiver detects the difference between DATA patterns and COMMAND data patterns, and routes each to the proper output latch. When a new pattern is latched to the output, the appropriate output strobe is pulsed. DSTROBE 1202 pulses when new DATA is stored, and CSTROBE 1203 pulses when new COMMAND data is stored. CSTROBE 1203 pulses for each new command data that appears, including SYNC. The rising edge of these STROBE pulses, signals the presence of new DATA or COMMAND data. After the new data is presented at the appropriate output, the STROBE signal falls midway through the same byte.

At this juncture several basic definitions will be made which will be helpful in understanding how the receiver operates.

As used in this section describing the receiver the terms "upstream" and "downstream" refer to the relationship of cascaded, i.e. serially connected, receivers. By convention, cascaded receivers monitor the data coming over the serial transmission media in parallel. When multiple width data patterns are sent over the media, the cascaded receivers "catch" successive data bytes. One receiver, the first in the serial chain, is selected to catch the first data byte. This is defined as the farthest upstream receiver. Its "downstream" neighbor is a serially coupled receiver which is designated to catch the next data byte, etc.

The terms "LOCAL" mode and "CASCADE" mode when referring to a receiver, indicate its two possible operating modes. These terms are further defined immediately hereinafter in a brief overview of how a receiver operates.

A given receiver accepts serial data input on its SERIN+ and SERIN− input pins which are depicted in FIG. 13. These inputs correspond to input 1206 in FIG. 12. This encoded data is loaded serially into a decoder. The decoded data is latched out to either the DATA or COMMAND data outputs. If a code violation is detected during decoding a violation output is generated as will be described hereinafter.

In the LOCAL mode, a receiver continuously deserializes, decodes, and latches parallel data to the data outputs. In the CASCADE mode, two or more receivers are serially linked. All the linked receivers monitor inputs from the transmission media in parallel and wait for a SYNC byte. When SYNC is detected in the shifter, and when CNB (pin 1211 in FIG. 12) is high, the first non-SYNC byte is captured and decoded.

The operation of the receivers in response to the state of their CNB inputs will be described in detail hereinafter. For now however, suffice it to say that according to the preferred embodiment of the invention, CNB high is permission, for a receiver to literally catch the next byte of data.

When the byte is captured, the IGM line (output 1204 in FIG. 12) goes high, setting the CNB input of the next downstream receiver. The downstream receiver has been monitoring the serial data on its SERIN lines in parallel with its neighbor and has seen both the SYNC symbol(s) and the first non-SYNC symbol. Since its CNB input was initially low, the downstream receiver waits to capture the first data symbol after its upstream neighbor asserts its IGM output; in effect after the upstream neighbor says "I-GOT-MINE". It will be shown with reference to FIG. 15 that in CASCADE mode an upstream receiver's IGM output is coupled to a downstream receiver's CNB input.

In the CASCADE mode, a receiver only captures one data symbol per cascaded data sequence, and then waits for another SYNC symbol to output the data and prepare for another sequence.

Having made the basic definitions that apply to the receiver, the pin description with reference to FIGS. 12 and 13 continues.

The CNB input referred to hereinbefore controls the capture and release of data by a receiver. If this input is connected to its CLOCK output, the receiver will be in the LOCAL mode and each received symbol will be captured, decoded and latched to the outputs.

In the ordinary CASCADE mode if the CNB input is high it allows the receiver to capture the first byte after a SYNC. The receiver will wait for another SYNC before latching the data out and capturing more data. If CNB is toggled low, it will react as if it had decoded a SYNC byte and cause any data to be output. An autorepeat feature in CASCADE mode will be explored after the normal LOCAL and CASCADE modes have been fully described.

CNB input is typically connected, in CASCADE mode, to an upstream receiver's IGM output. The first receiver in line will have its CNB input connected to VCC which simulates an IGM asserted on every symbol, i.e. the first receiver always has permission to capture the first byte after SYNC.

The IGM pin of a given receiver signals its downstream neighbor (if one exists) that the upstream neighbor has captured its assigned data byte. IGM falls at the mid-symbol point, when the first half of a SYNC byte is detected in the receiver's shifter. It rises when, at the mid byte point, it detects a non-SYNC byte. This feature may be used to generate an early warning of incoming data.

CLOCK is a free-running clock output which runs at the XTAL oscillator rate, and is synchronous with the serial transfer rate. It is a byte interval clock which falls at the time the decoder latch is loaded from the shifter, rises at mid-byte, and can be used to drive X1 on other receivers. Note that as opposed to the transmitter CLOCK pin, CLOCK in the receiver is an output only, i.e. not a bidirectional pin. The output will not come from the receiver's clock generator, but rather from byte synchronization logic which is described in detail hereinafter with reference to the functional description of the receiver.

FIG. 12 also depicts a violation output pin 1212. The rising edge of a signal on this pin signals that a signalling violation was detected during the decode of incoming data. This signal rises at the same time that DATA or COMMAND outputs change. It will remain true until a nonviolation pattern has been received. The details of violation detection by the receiver is also explained with reference to the functional description of the receiver.

Again, FIGS. 12 and 13 show SERIN+ and SERIN− which are differential serial data inputs coming from the synchronous serial transmission media to which the SERIN pins are coupled. This data, which comes over the transmission media as NRZI data, is decoded by a media interface device in the receiver and then shifted serially into a shifter. These differential ECL inputs accept ECL voltage swings, which are referenced to +5.0 V. They are assumed to be driven through isolating capacitors, by differential 50 ohm terminated lines.

According to the preferred embodiment of the invention the SERIN+ and SERIN− inputs also serve as test inputs for exercising the internal logic of a receiver.

In the disclosed receiver the CNB pin is a TTL compatible input. Data pins 0–7, pins A and B, command pins 1 and 0, the DSTROBE and CSTROBE pins, the violation pin, the IGM pin and the CLOCK pin are all TTL compatible outputs. SERIN+ and SERIN− are ECL compatible inputs.

FIG. 13 depicts two more pins; X1, and X2 which together with the DMS pin described hereinbefore are the depicted "nonlogic" pins. X1 and X2 are the XTAL input pins, connected to the on chip oscillator which oscillates at the fundamental frequency of a parallel resonant crystal, shown connected to pins X1 and X2 in FIG. 12.

Not shown in FIG. 13, but referred to in FIG. 12, are the two connections to VCC, two connections to GND and a filter pin.

The VCC connections are, TTL VCC which supplies current to the TTL I/O circuits and CML VCC which supplies current to all the internal logic and analog circuits. TTL VCC and CML VCC are isolated from each other to reduce internal noise coupling, but will, according to the preferred embodiment of the invention, be connected to a common external 5 V. supply.

The GND connections are, TTL GND, used by the TTL I/O circuits and CML GND, which is used by all internal logic and analog circuits. These two grounds are separated to reduce internal noise coupling, but according to the preferred embodiment of the invention, are connected to a common external ground reference.

The filter pin, which is shown in FIG. 12, may be used to allow a low-pass filter to be added to the on chip PLL frequency multiplier. As in the transmitter, such a filter could consist of a relatively noncritical capacitor to ground.

A functional description of receiver 104 will now be presented with reference to FIGS. 14, 15, 16, 17 and 18 as appropriate.

Figure 14:
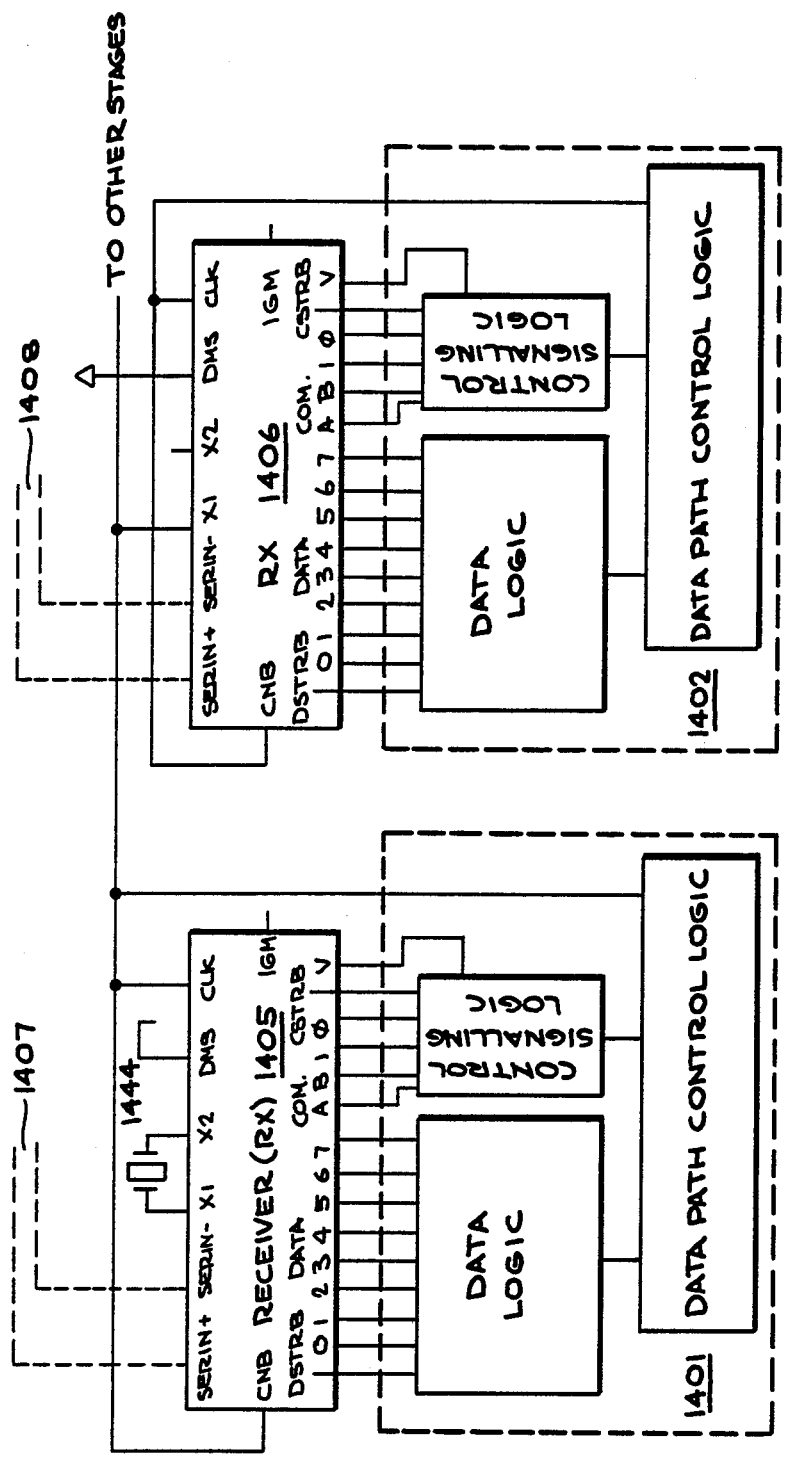
FIG. 14 is an illustration of the disclosed receiver in one of its' two operating modes, the LOCAL mode.

FIG. 14 depicts an example of two receivers, each interposed between a host system and a private serial link, where each receiver is set up to operate in LOCAL mode.

Figure 15:
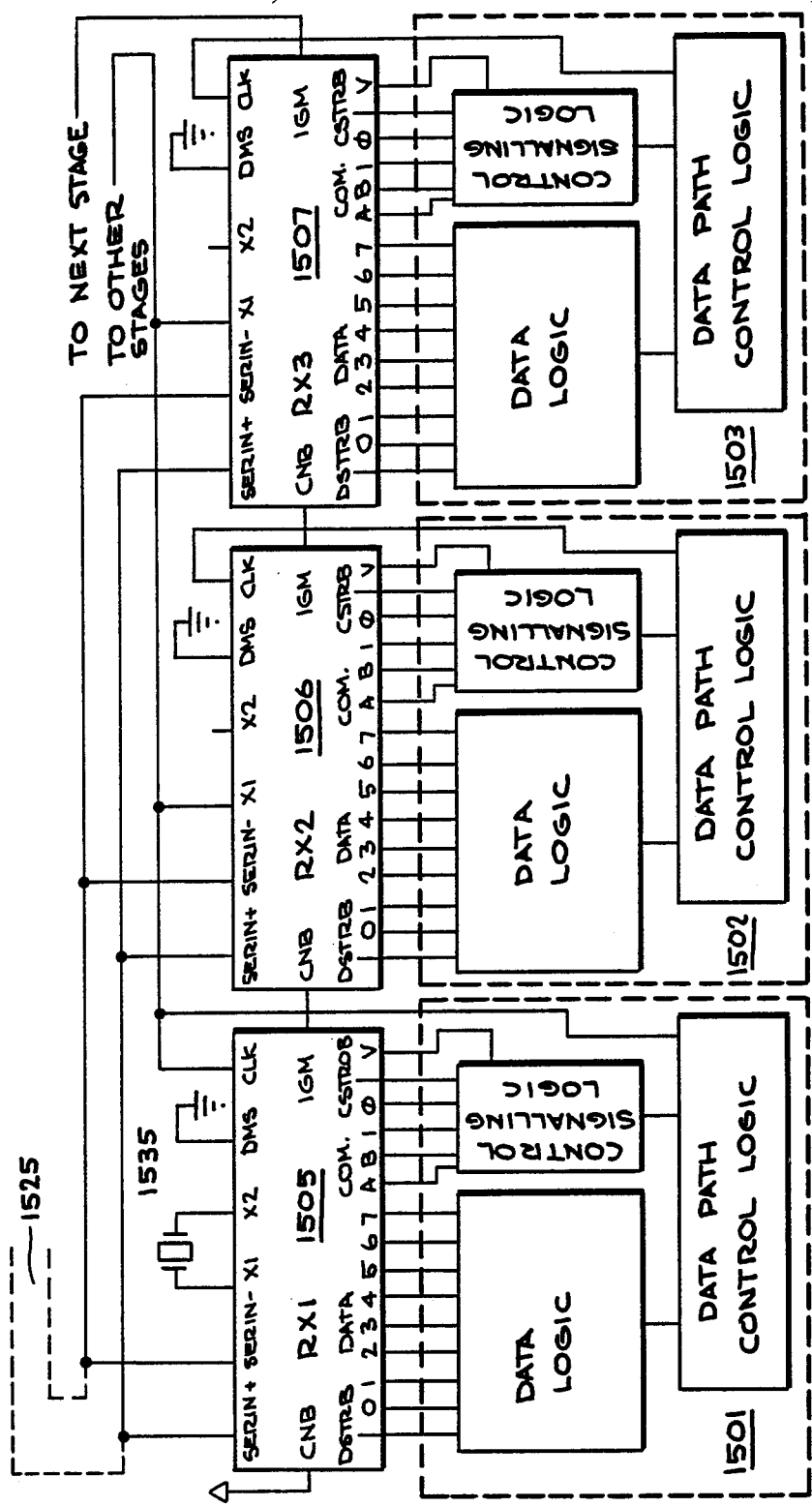
FIG. 15 is an illustration of the disclosed receiver in one of its' two operating modes, the CASCADE mode.

FIG. 15 depicts an example of cascaded receivers which field a wide data pattern coming off of a single serial link.

Figure 16:
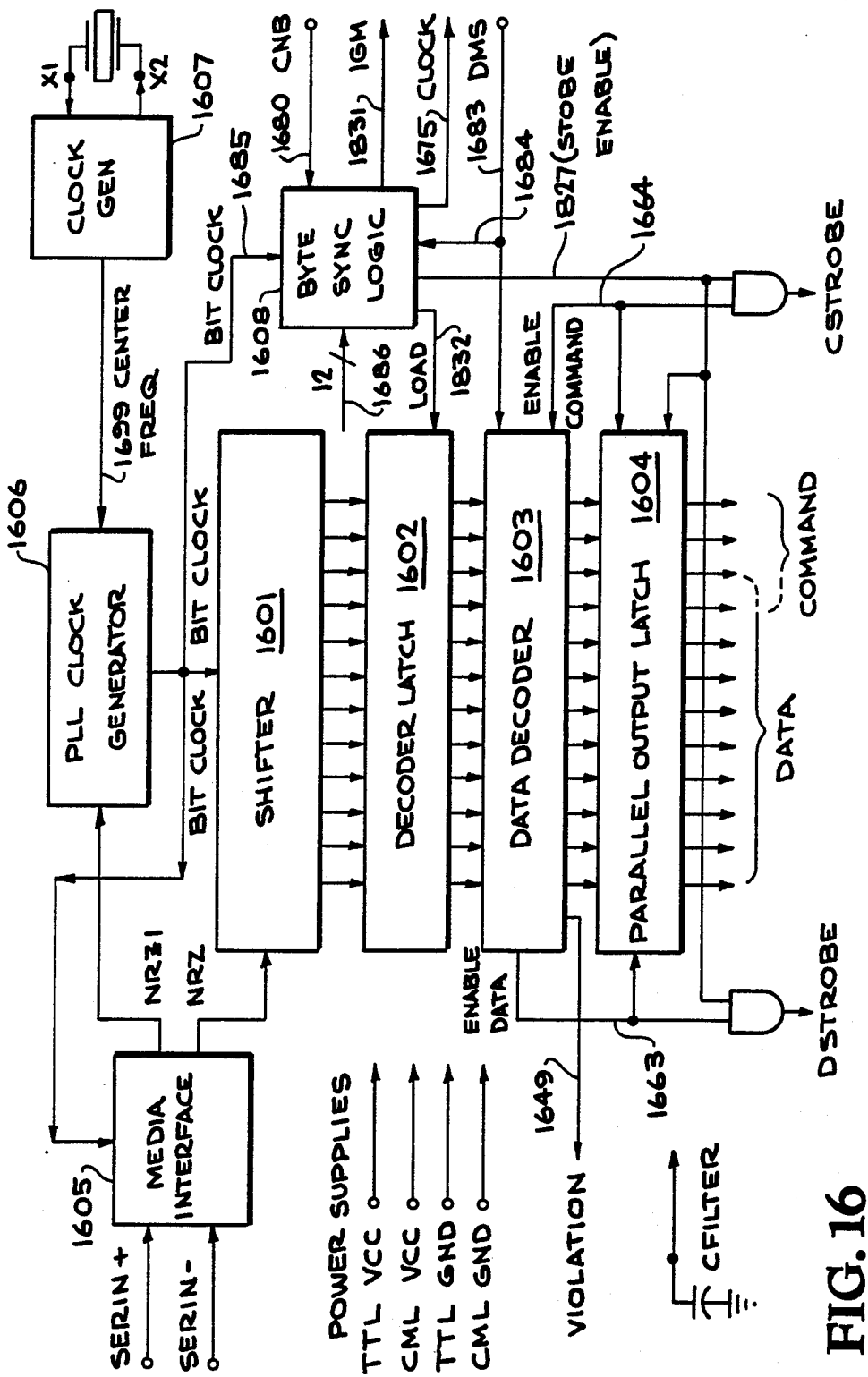
FIG. 16 is a functional block diagram of the integrated circuit on the receiver chip the pin diagram of which is shown in FIG. 12.

FIG. 16 depicts a functional block diagram of the integrated circuit on receiver chip 104, showing the same inputs and outputs as shown in the pin diagram of FIG. 12.

Figure 17:
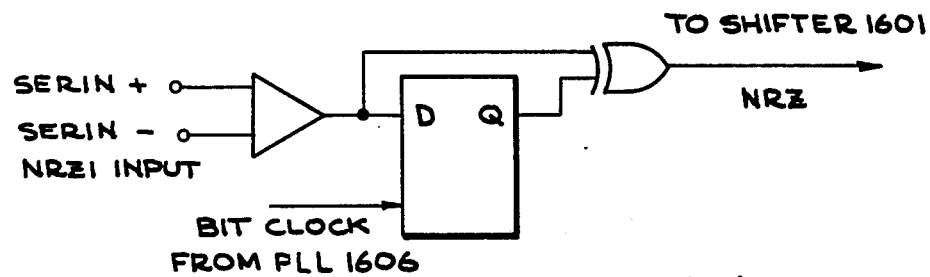
FIG. 17 is a schematic of the media interface circuit shown in FIG. 16.
Figure 18:
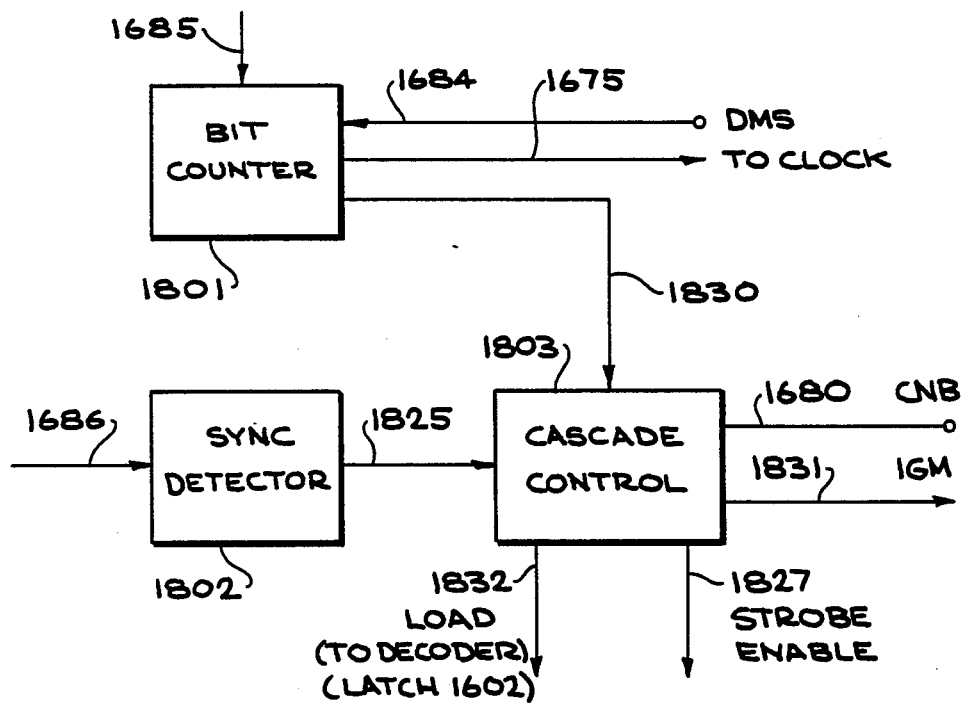
FIG. 18 is a more detailed block diagram of the byte synchronization logic shown in FIG. 16.

FIGS. 17 and 18 aid in the description of portions of FIG. 16. It may be seen with reference to FIG. 14 that two host systems are depicted, system 1401 and system 1402, each of which accept outputs from receivers 1405 and 1406 respectively. Host system 1401 is shown as receiving 8 bits of DATA from receiver 1405 and the DMS pin of receiver 1405 is shown equal to GND, signifying the 8 bit mode. It should be noted that that COMMAND outputs are 4 bits wide in this case. It should be further noted that the inputs on the SERIN pins of each receiver are from separate serial links, shown as links 1407 and 1408 in FIG. 14. Furthermore, the CNB pin of each receiver is tied to its respective CLOCK output, signifying LOCAL mode operation.

The DSTROBE and CSTROBE outputs of each receiver may be seen to be respectively connected to the data logic and control logic of the depicted host systems.

The DMS pin receiver 1406 is shown connected to VCC, indicating receiver 1406 is to output 9 bits of DATA and 3 bits of COMMAND to host system 1402. This may be seen to be the case in FIG. 14.

FIG. 14 also depicts separate data path control logic, shown as a part of each host system, coupled to the CLOCK pin of each receiver. This logic, which does not constitute part of the present invention, controls flow of data in the host system, and may need to keep track of byte interval boundaries for the host system. An example of where this would be important is in case of clock stretching by the receiver. According to the preferred embodiment of the invention, clock stretching would be desirable if a receiver loses and then reacquires synchronization.

Finally, it should be observed that the CLOCK pin of receiver 1405 is depicted as connected to other stages. Note that receiver 1405's CLOCK output drives receiver 1406 via its X1 pin and crystal 1444's connection to X1, X2 or receiver 1405.

It may be seen with reference to FIG. 15 that host systems, 1501, 1502 and 1503, are set up to separately receive 8 bits of DATA and 4 bits of COMMAND from each of receivers 1505, 1506 and 1507 in parallel. Receivers 1505, 1506 and 1507 are serially linked (cascaded) via their CNB and IGM pins as shown with receiver 1505's CNB input wired to VCC (high). This depicts "normal" CASCADE mode.

The 8 bit DATA mode is reflected by the DMS pin of each receiver being wired to GND.

The SERIN pins of all the receivers can be seen as coupled in parallel to the transmission media 1525. All of the receivers "see" what's on the link at the same time. Receiver 1505's CNB input wired high give it permission to capture the first data byte after a SYNC is detected.

As soon as receiver 1505 catches the first data byte after SYNC, its IGM output goes high and receiver 1506 may catch the next byte of the serial transmission link and so on. The details of how the receivers operate so that all data is captured and output in parallel will be set forth hereinafter with reference to a description of the byte synchronization logic in each receiver.

The CLOCK outputs of each receiver are again shown connected to each host system's data path control logic, for the same reason as in LOCAL mode operation. CLOCK from the lead receiver (with CNB tied to VCC) is again input to X1 of downstream receivers for synchronization.

Finally, crystal 1555 is shown connected to X1 and X2 of receiver 1505 for providing the fundamental frequency to a clock generator, described hereinafter, on board the receiver.

A detailed functional description of the receiver with reference to FIG. 16 will permit the tracing of an arbitrary DATA/COMMAND byte captured off the serial link as it propagates through a given receiver in its various operating modes. However, before proceeding with this detailed functional description several assumptions made and conventions adopted in accordance with the preferred embodiment of the invention will be set forth.

It is assumed that the space between patterns coming off the serial link in both LOCAL and CASCADE mode is filled with SYNC patterns to maintain link synchronism and provide pulses to keep receiver PLL circuits in lock. The method by which these patterns are generated and the reasons for choosing the SYNC pattern set forth in accordance with the preferred embodiment of the invention has already been fully disclosed with reference to the transmitter.

The encoding conventions set forth with respect to the preferred embodiment of the transmitter are assumed to have been followed.

As a result, the decoder used in the receiver must be able to decode ten (10), eleven (11) or twelve (12) bits of data into an eight (8), nine (9) or ten (10) bit pattern for parallel output. In effect the decoder performs the inverse function of the encoded described with reference to both the transmitter and the ANSI X3T9.5 FDDI specification.

It should be recalled that the ANSI X3T9.5 code was chosen so that symbol patterns will have the same average amount of "HIGH" time as "LOW" time. This "DC Balance" is an attempt to minimize the data induced noise effects on an AC coupled system, in which DC shifts can cause errors in data recovery. These errors appear as jitter in the recovered waveform.

As with encoding, decoding can be accomplished using a ROM with a lookup table for data decoder 1603 as shown in FIG. 16.

Decoding conventions which differ from those herein to realize the preferred embodiment of the receiver, may be adopted without departing from the scope or spirit of the invention.

Turning now to the detailed discussion of FIG. 16. The serial link speed is determined by the transmitter oscillator, but the receiver must know what data rate to expect. It must also have the ability to follow actual data rates, either faster or slower than the local clock.

The anticipated serial link speed is derived from a master frequency source. This source can either be the XTAL oscillator built into clock generator 1607 or a clock signal applied through one of the receiver's XTAL pins. Clock generator 1607 is virtually the same as clock generator 604 in the transmitter (shown in detail in FIG. 8) except that no bidirectional clock pin exists in the receiver and the center frequency output on lead 1699 comes from generator 1607's master counter.

The frequency source is multiplied by ten (8 bit mode), eleven (9 bit mode) or twelve (10 bit mode) using the internal PLL in clock generator 1607. The logic that transfers data from shifter 1601 is buffered to the receiver's CLOCK output. This output may be used by other receivers or be used for other oncard clock functions. The CLOCK output is synchronous with the symbol being transferred from the shifter, and is at the XTAL fundamental frequency.

As in the transmitter, the absolute range of frequencies for the receiver can be chosen by the user, but again it should be possible to vary the chosen working frequency over a three to one range.

The following chart shows the relationship between mode, XTAL frequency, output pattern rate and divide ration. It parallels the chart in the transmitter section which focuses on the input pattern rate.

| MODE | XTAL freq | Output pattern rate | Divide Ratio |
|---|---|---|---|
| 8 Bit | 12.50 mHz | 80 nS/pattern (100 mBit/sec) | 125/10 |
| 9 Bit | 11.36 mHz | 88 nS/pattern (102 mBit/sec) | 125/11 |
| 10 Bit | 10.42 mHz | 96 nS/pattern (104 mBit/sec) | 125/12 |

The SERIN+ and SERIN− inputs shown in FIG. 16 are driven by differential ECL voltages, referenced to +5 V. These inputs serve both as a serial data input, and a reference for PLL tracking.

As indicated hereinbefore, the differential inputs on these pins can be used to force the receiver into a test mode. This will allow testing of the logic in the latches, decoder, and shifter without having to first stabilize the PLL's.

According to the preferred embodiment of the invention, if SERIN− is held low (below 1.5 V.) the internal VCO is switched out, and everything is clocked from the XTAL input. This means that the serial output data rate will be at the XTAL rate, not at 10X, 11X or 12X as in an operating system. In this mode SERIN+ becomes a single ended serial data input with nominal 100K ECL threshold voltages.

The SERIN+ and SERIN− inputs are first applied to media interface 1605. Logic for realizing the media interface is set forth in FIG. 17. In the preferred embodiment, NRZI data is converted to NRZ data by the combination of the buffer, D-flip-flop and exclusive or gate shown in FIG. 17, under control of a bit clock. The bit clock input is generated by PLL clock generator 1606 to be described hereafter.

Not shown in FIG. 17, but output by the media interface (see FIG. 16) to PLL clock generator 1606 is NRZI data buffered from the serial link and not converted to NRZ data.

FIG. 16 goes on to depict the phase locked data recovery loop. The loop follows the incoming NRZI data and allows the encoded clock and data stream to be decoded into clock and data patterns. Its center frequency is determined by the training loop located in clock generator 1607 and must be capable of tracking data with frequency offsets of ±0.1% and with ±40% bit time jitter.

PLL 1606 actually uses the clock information extracted from the data itself (the NRZI mandated flux changes) to predict where the actual bit time edges of data being received are located. The center frequency shown provided by clock generator 1607, is used to predict approximately how fast the data is supposed to be coming off the serial link.

PLL 1606 outputs a series of bit clock pulses which are supplied to the media interface 1605, shifter 1601 and byte synchronization logic 1608. The PLLs in the receiver, like the PLL in the transmitter, may be realized by a combination of standard off-the-shelf components with reference to the nonstandard arrangements disclosed in the U.S. Pat. Nos. 4,565,976 and 4,628,461 previously incorporated by reference. The key difference between the 3 phase locked loops called for is that the phase detector of PLL 1606 operates at the bit clock rate and must ignore missing pulses, i.e. must incorporate the teachings of U.S. Pat. No. 4,628,461 or its equivalent. The other PLLs operate at the byte clock rate, running off the crystal oscillator rather than directly off the transmitted bit stream, and optionally can include the teachings of the incorporated patents.

FIG. 16 goes on to show shifter 1601 which is serially loaded from media interface 1605 with NRZ data, using PLL 1606 as a clock. Shifter 1601 can be realized using a conventional high-speed serial-to-parallel shift register.

Data from shifter 1601 is transferred to decoder latch 1602 under the control of byte synchronization logic 1608. Latch 1602 can also be realized using 74LS374s.

FIG. 18 depicts in block diagram form the preferred method for performing the functions required of the byte synchronization logic. Other methods and circuits to realize the functions set forth in FIG. 18 may occur to those skilled in the art without departing from the spirit or scope of the invention.

To better understand the byte synchronization logic, it should first be recalled that the incoming data stream is a continuous stream of data bits, without any significant signal which denotes byte boundaries. The byte synchronization logic will continuously monitor the data stream, and upon discovering the reserved code used for SYNC, will initialize a synchronous counter which counts bits, and signals byte/symbol boundaries.

It will be shown that the byte sync logic is responsible for generating the strobe signals for the parallel output latches of the receiver. Parallel outputs are made on a symbol/byte boundary, when CNB falls, or when SYNC is detected. The logic must also control the IGM signal and byte clock output signal, (for the CLOCK output).

It should be recalled that in accordance with the preferred embodiment of the invention, the IGM signal will fall when the first half of a SYNC is detected in the shifter. It will remain low until the first half of a non-SYNC byte is detected in the shifter, whereupon it will rise, assuming that the CNB input is asserted. A continuous stream of SYNC will cause IGM to stay low. A continuous stream of normal data or command symbols will cause IGM to go high and remain high.

In CASCADE mode the IGM of the last receiver, and in LOCAL mode the sole receiver's IGM output, will go high during the byte before data appears at the output. Data signalled by such an IGM signal will take one more byte time to appear at the outputs. As indicated hereinbefore, this feature may be utilized to generate an early warning of incoming data.

The inputs to byte synchronization logic 1608 are shown in FIG. 18 to be the same as on FIG. 16. A bit clock input from PLL 1606 is shown connected to bit counter 1801 via lead 1685. A 12 line input to SYNC detector 1802 is shown as input 1686 in FIG. 18. Input 1686 is also shown in FIG. 16 as going into logic 1608. Further inputs to logic 1608 are the DMS input on lead 1684 shown connected to bit counter 1801 in FIG. 18, and the CNB input on lead 1680 connected to cascade control unit 1803 of FIG. 18.

SYNC detector 1802 operates to do just what its name implies. The shifter is monitored and if a SYNC is detected, detector 1802 signals cascade control via lead 1825. SYNC detector 1802 may be realized by a PAL.

Bit counter 1801 is the synchronous counter referred to hereinbefore that counts bits and signals byte/symbol boundaries. The DMS input via lead 1684 and the bit clock input on lead 1685 provide the timing and byte information required for counter 1801 to output both the byte clock to CLOCK on lead 1675 and the counter state to cascade control 1803 on lead 1830.

Cascade control 1803, in addition to the inputs on leads 1825 and 1830, receives the CNB signal on lead 1680. Control 1803 operates, according to the preferred embodiment of the invention, as follows.

If CNB is high; if the data in shifter 1601 is not SYNC (per SYNC detector 1802); and if shifter 1601 is not full (an internal flag in cascade control is set or cleared by logic 1803 as described hereinafter to keep track of whether shifter 1801 is full or not) then, cascade control will raise IGM on line 1831; assert load on line 1832; and set its internal "shifter full" bit.

The net effect of this operation by cascade control is to take data out of shifter 1601 and place it in decoder latch 1802. No output is produced at this time since no strobe is enabled. Also, in CASCADE mode, the downstream neighbor is informed of the captured byte by the IGM output being raised.

Another possible set of inputs to cascade control 1803 is when CNB is high; a byte boundary is signalled by bit counter 1801; and the shifter full bit is set. This state of affairs implies the receiver is waiting for a SYNC to output the data indicated by the full bit. In this case nothing is done by cascade control.

If a byte boundary is signalled, if the shifter full bit is set and either a SYNC is detected or CNB is low (for example in LOCAL mode), then cascade control 1803 caused IGM to drop, strobe enable is asserted on lead 1827 and the internal full/empty flag is cleared since output has been enabled. In the same circumstances, but with the full bit clear to begin with IGM would still be taken down, but strobe enable would not be asserted. An example of where this might happen is where a series of SYNCs appear on the media.

Finally, if a byte boundary is signalled, if CNB is low and the full flag is not set, cascade control again does nothing. This could happen, for example in CASCADE mode where no data has yet been captured by a receivers' upstream neighbor.

It should be noted that via the shifter full flag, cascade control 1803 remembers if it has new data to deal with. If not, even though a SYNC is detected, no strobe is enabled.

Now that byte synchronization logic 1608 has been completely described, the balance of FIG. 16 can be easily understood.

To begin with it should be recalled that data is loaded from the shifter 1601 to decoder latch 1602 at symbol/byte boundaries. This is enabled by signals on "load" lead 1832 from logic 1608 if new data has been detected. Decoder latch 1602 serves as input to data decoder 1603.

Decoder 1603 decodes 10, 11 or 12 data inputs into 12 outputs. In eight bit mode, data is encoded into either an 8 bit DATA patern or a 4 bit COMMAND pattern. In nine bit mode, data is decoded into either a 9 bit DATA pattern or a 3 bit COMMAND pattern. In ten bit mode, data is decoded into either a 10 bit DATA pattern of a 2 bit COMMAND pattern. The coding (and therefore the decoding) conventions that are in accordance with the preferred embodiment of the invention have been set forth hereinbefore.

The particular pattern width to be handled by decoder 1603 is specified by the DMS input on lead 1683.

Decoder 1603 separates DATA symbols from COMMAND and causes the appropriate strobe output to be asserted. The path for strobe enable pulses can be seen in FIG. 16 as lead 1663 for DATA and 1664 for COMMAND information. These signals, together with "load" signals from logic 1608 to the AND gates and output latch 1604 (as shown in FIG. 16), control outputs at byte boundaries.

Decoder 1603 also detects violations and asserts the violation flag by outputting a signal on lead 1649. Violations are defined as any pattern that cannot be explicitly sent by a transmitter or any pattern that can't be identified by decoder 1603.

Finally, FIG. 16 shows output latch 1604 clocked by strobe lead 1827 to reflect the most recent data on the link. Any DATA pattern will be latched to the DATA outputs and will not affect the status of the COMMAND outputs. Likewise, any COMMAND pattern will be latched to the COMMAND outputs without affecting the state of the DATA outputs.

Any data transfer, either DATA or COMMAND, will be synchronous with an appropriate output strobe. However, as mentioned hereinbefore, there will be CSTROBES when there is no active data on the serial link since SYNC is a valid COMMAND code.

Figure 19:
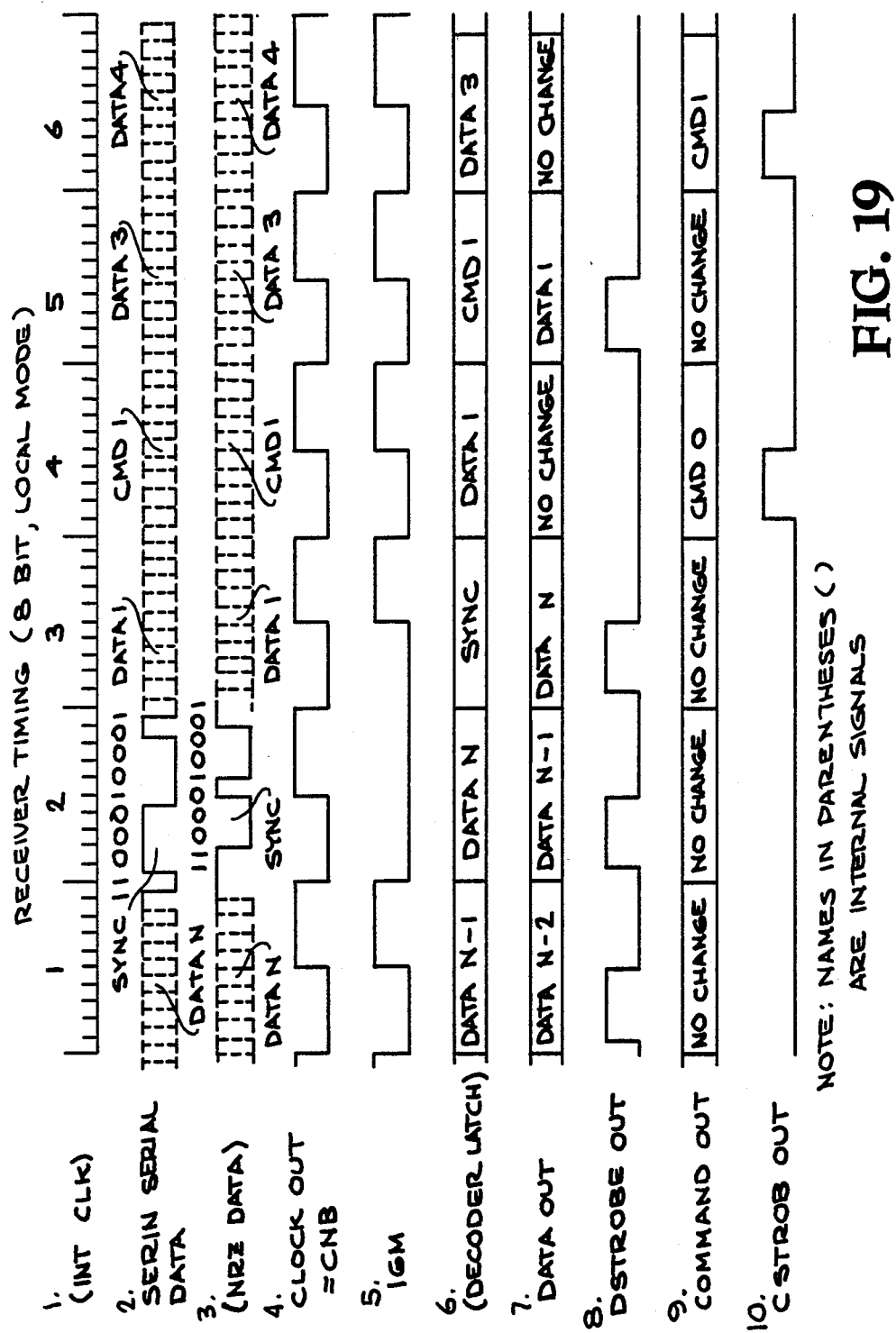
FIG. 19 is a timing diagram depicting the operation of an 8 bit receiver of a system, built in accordance with the teachings herein, operating in LOCAL mode.

Having completely followed the path of data captured by a receiver built in accordance with the teachings of the invention, a recap of how the receiver functions may be had with reference to FIGS. 19 and 20.

FIG. 19 is a receiver timing diagram for a receiver operating in LOCAL mode. The serial link is presenting 10 bit wide data patterns, implying 8 bit wide outputs.

The diagram illustrates how the byte schronization logic works in general and particularly illustrates a situation where a DATA byte, a COMMAND byte, and 2 more DATA bytes, come in over the serial transmission media following a SYNC, and how CNB and IGM operate in LOCAL mode.

The top line of the diagram labeled INT CLK (line 1) represents internal receiver bit clock pulses. Since this is 8 bit mode, a "byte interval" is 10 bits long. Byte intervals 1–6 are depicted above line 1.

Line 2 represents NRZI data off the transmission link. Line 3 represents NRZ data which goes to the shifter.

On line 4, labeled clock out=CNB, the interval between the clock output falling can be seen to be 10 internal clock periods (or 1 byte interval). This being LOCAL mode, CNB is tied to CLOCK, in effect giving the receiver permission to capture a byte each interval.

The diagram illustrates how after ½ byte the receiver knows whether a SYNC or data is in the shifter. IGM (shown on line 5) follow CNB unless a SYNC is detected, which will cause IGM to stay low.

Line 6 of FIG. 19 depicts DATA N-1 in the decoder latch during the first byte interval. At the same time that DATA N is in the shifter and DATA N-2 is at DATA out (line 7). Note DSTROBE out (line 8) is high only for ½ byte and falls at mid byte interval 1. Both DSTROBE and CSTROBE can be seen high for at most ½ byte interval. In FIG. 19 no change on the command output or on CSTROBE out (lines 9 and 10) is shown during byte interval 1.

During byte interval 2 the SYNC detected in the shifter can be seen to hold IGM low, DATA N reaches the decoder latch, and data N-1 is output via the DSTROBE in the first half of the interval. Again, no change occurs regarding command output or CSTROBE.

At the next byte interval DATA 1 is in the shifter, SYNC is shown transferred to the decoder latch, and IGM stays low until mid byte 3 when it detects DATA 1 in the shifter and goes high. FIG. 19 again shows a DSTROBE, which causes DATA N to be output, with no change once again regarding command output or CSTROBE.

During the fourth byte interval the SYNC can be seen to have been decoded as a command (CMD 0) and output on command out upon assertion of CSTROBE. DSTROBE is not pulsed and DATA N remains on the data outputs.

In the fifth byte interval DSTROBE is enabled and DATA 1 is output, CMD 1 is in the encoder latch, DATA 3 is in the shifter and no change occurs on the command output i.e. the command corresponding to a SYNC, still appears on this output.

Finally, in the last depicted byte interval, DATA 4 is in the shifter, DATA 3 has propagated to the decoder latch, DATA 1 stays on the DATA outputs, CSTROBE is enabled and CMD 1 appears on the command outputs.

Figure 20A:
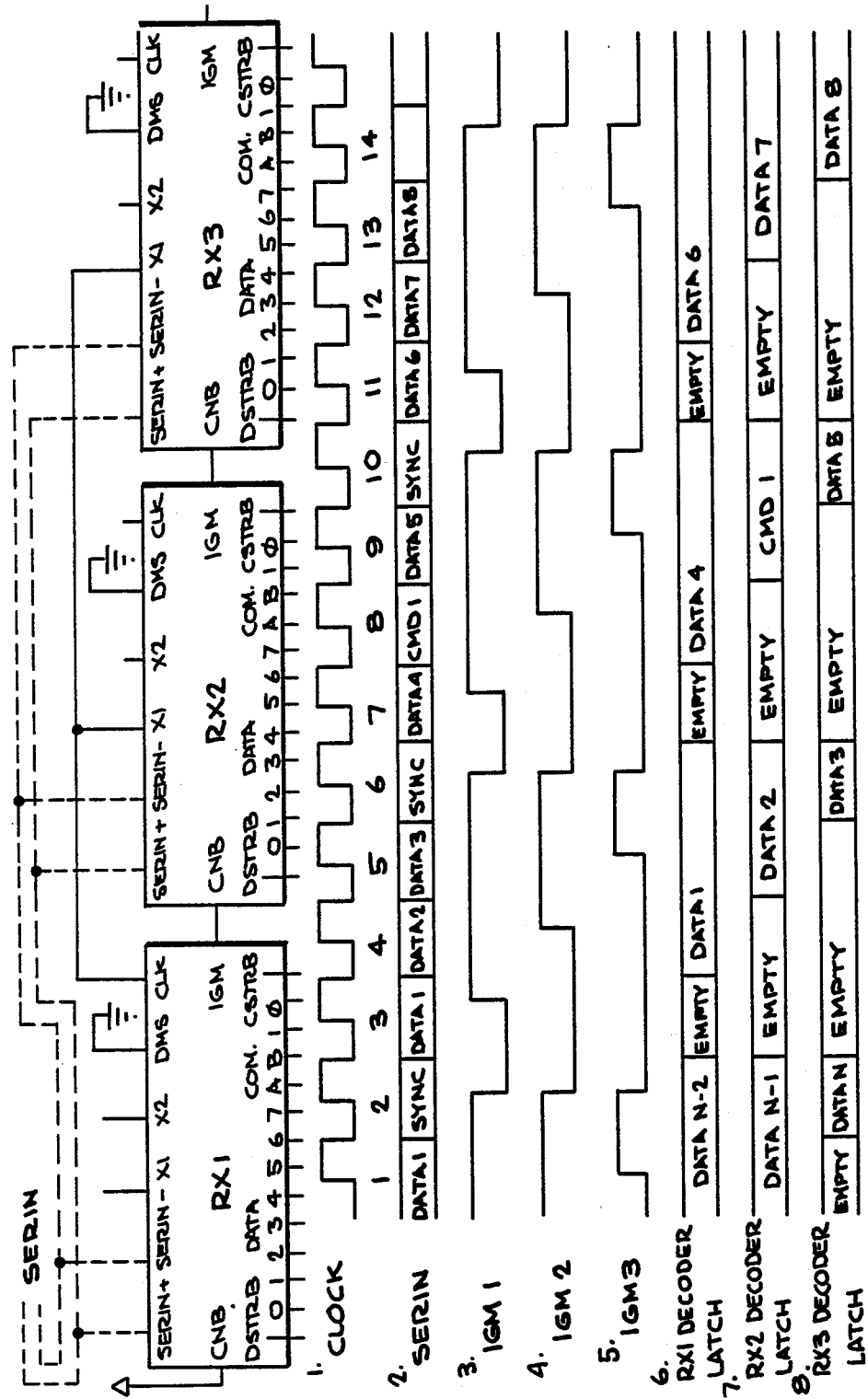
FIG. 20A continued onto
Figure 20B:
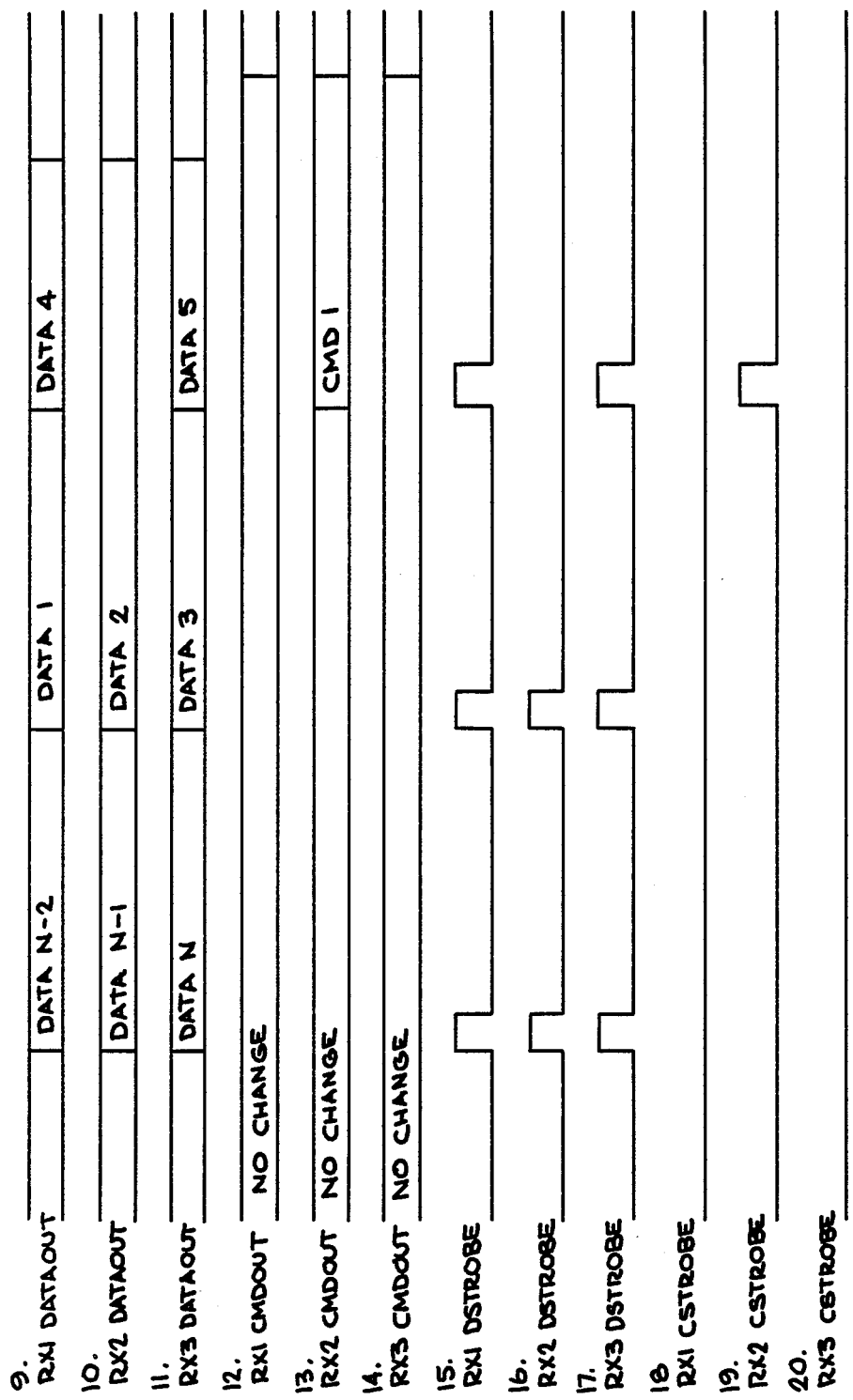
FIG. 20B is a timing diagram depicting the operation of an 8 bit receiver of a system, built in accordance with the teachings herein, operating in CASCADE mode.

In FIGS. 20A and 20B, the timing diagram for a 3 tier cascaded receiver arrangement is shown. Line 1 of FIG. 20A depicts the byte clock. Line 2 depicts the data observed on the SERIN pins of all three receivers in parallel. Lines 3, 4 and 5 depict: the IGM output of the farthest upstream receiver in CASCADE mode (shown as RX1 with CNB tied to VCC); the IGM output of the downstream receiver connected to RX1 (shown as RX2); and the IGM output of the farthest downstream receiver RX3, respectively, (RX1, RX2 and RX3 are depicted at the top of FIG. 20A.

Reference should be made back to FIG. 15 which shows how these three receivers and host systems could be interconnected. Note in FIG. 20A that the CNB input of RX2 is tied to RX1's IGM output and that the CNB input of RX3 is tied to RX2's IGM output. Note also that all three DMS pins shown are grounded depicting 8 bit mode.

FIG. 20A goes on to show that at the end of byte interval 1 (the first time CLOCK is shown to fall) DATA N is transferred to the decoder latch from the shifter in RX3 and that DATA N-2, DATA N-1 and DATA N are all in their respective decoder latches until the next byte boundary (between interval 2 and 3). This may be seen with reference to lines 1, 2, 6, 7 and 8 of FIG. 20A.

No outputs are shown (lines 9–11) at DATAOUT of RX1, RX2 or RX3. Also, no changes in the CMDOUT of RX1, RX2 or RX3 are seen (lines 12–14). The DSTROBE outputs and CSTROBE outputs are all shown as low (lines 15–20) in byte intervals 1 and 2.

During byte interval 2, all the IGM signals fall because of the detected SYNC in the shifter.

At the beginning of byte interval 3, DATA N-2, DATA N-1 and DATA N are all output, as enabled by the DSTROBE pulses. The decoder latches are all emptied.

Midway through byte interval 3, RX1 detects DATA 1 in the shifter and IGM 1 goes high. RX2 is now authorized to catch the next byte, namely DATA 2. At the byte 3/byte 4 interval boundary, DATA 1 is transferred into RX1's decoder latch. The decoder latches for RX2 and RX3 are shown in FIG. 20A as empty at this time.

DATA 2 is transferred from the shifter to RX2's decoder latch at the byte 4/byte 5 boundary and similarly DATA 3 gets transferred to RX3's decoder latch at the byte 5/byte 6 boundary.

IGM 2 is shown to have gone high mid byte 4 allowing RX3 to catch DATA 3 during byte 5.

IGM 3 goes high mid byte 5 when DATA 3 is detected by RX3.

The SYNC shown in byte interval 6 forces all the IGM's low again and permits DATA 1, DATA 2 and DATA 3 to be output during byte interval 7. The DSTROBE lines are shown high for the first half of byte interval 7 as well.

FIG. 20A shows the IGM sequence is to repeat as DATA 4, CMD 1 and DATA 5 are taken off the serial link and strobed to their appropriate outputs. Note RX2's CSTROBE going high in order to output CMD 1.

Finally, FIG. 20A shows DATA 6, DATA 7 and DATA 8 transferred to the decoder latched for the next round of processing and output.

The CASCADE mode of operation set forth with respect to the receiver and system at large is worthy of special note. As disclosed, CASCADE mode allows the receivers to transfer data at the byte rate. Without the "permission to capture data" scheme, set forth hereinbefore the receivers would have to transfer data at the bit rate which is of course much higher. Furthermore, a receiver would have to "know" where it is in a cascaded chain. According to the invention, all that is important is whether or not permission to capture data has been signalled by CNB being high. This minimizes design constraints for the user.

The foregoing completes the disclosure of the novel system and its components. The transmitter and receiver have been shown to have operating modes and possible configurations which can accomodate a wide variety of data patterns.

It should be noted that although cascaded systems are usually thought of as having the same number of transmitters and receivers (so that each parallel input bit is sent to a matching parallel output line) an exact match is not really required. Some interesting results can be realized with unbalanced systems. For example, several cascaded transmitters connected to a single receiver in the LOCAL mode will convert wide parallel data to byte wide parallel data. Thus, 32 bit data can be converted to 8 bit data, etc. Likewise, a single local mode transmitter connected to several CASCADE mode receivers will convert byte wide parallel data to wide forrmat parallel data. Here the arrangement could, for example, take 8 bit data and convert it to 64 bit data, etc.

Cascaded systems usually require the data packet length to be the number of patterns in the chain, plus one. This extra pattern is the SYNC which restarts the string. For example, the cascade system set out hereinbefore would be operative to transfer a four byte string of data every five byte times.

If it is necessary to remove this extra pattern to achieve a higher data rate, it is possible to use an external inverter in the receiver to cause the string to self restart. Following the example, by removing the extra pattern a four byte string of data could be transferred every four byte times after it starts.

The typical first receiver in CASCADE Mode has its CNB input tied to VCC. However, if an external inverter (with input from the 'last' IGM output), is connected to this CNB input, the string will automatically repeat. This is depicted in FIG. 21B which shows a cascaded receiver bank set up for the autorepeat feature.

Figure 21A:
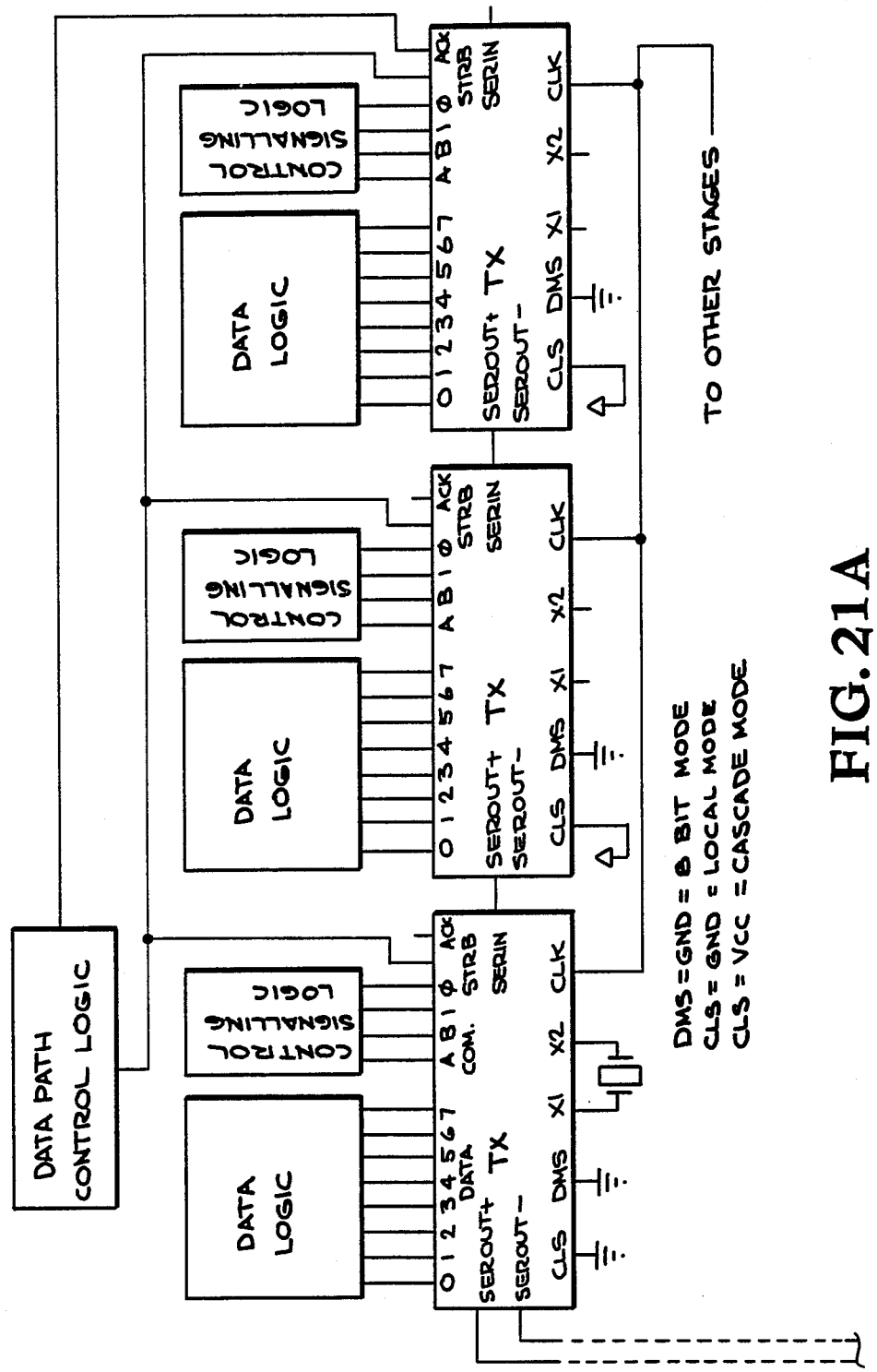
FIG. 21A continued onto
Figure 21B:
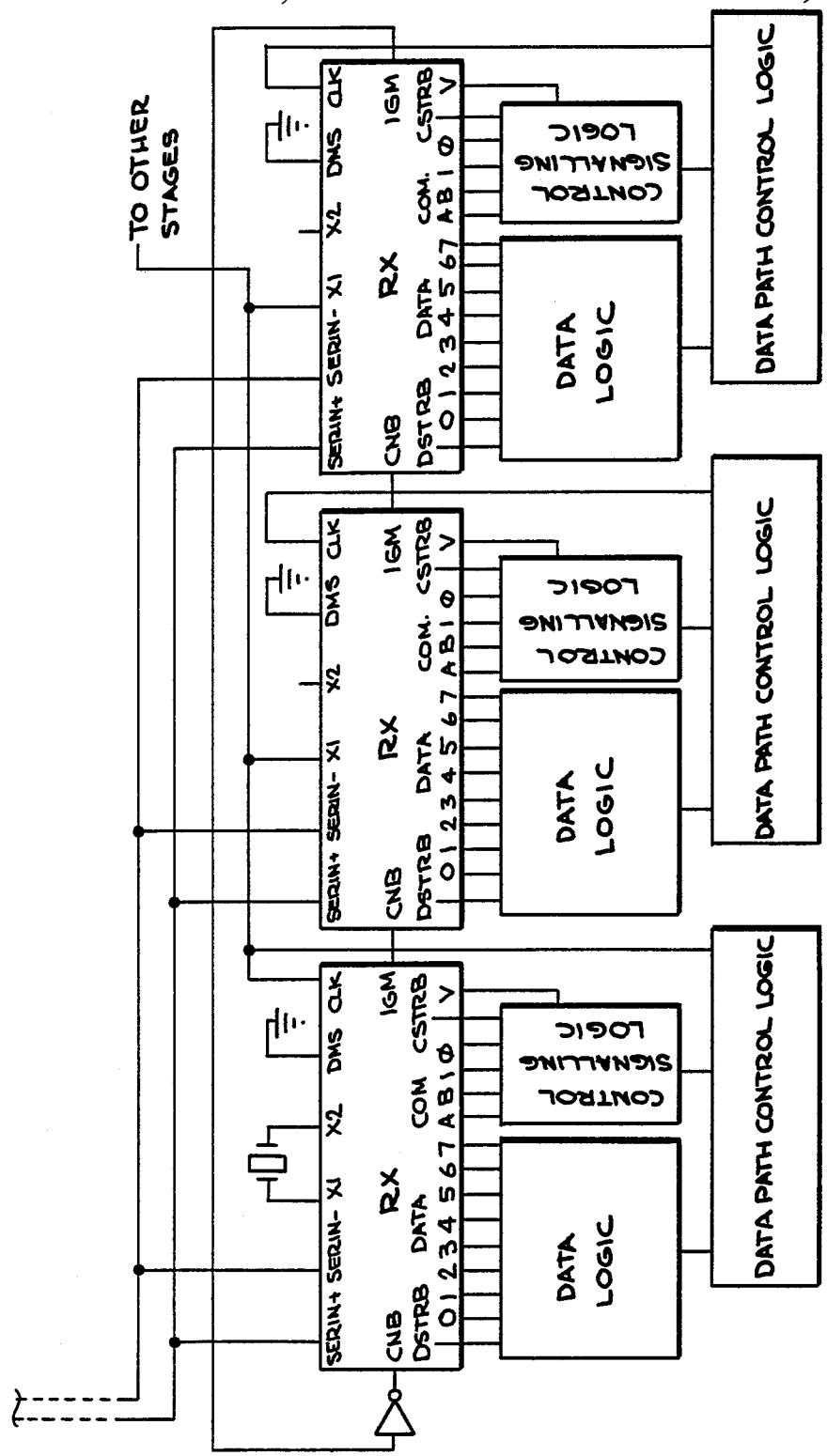
FIG. 21B is an illustration of the disclosed system set up to operate in CASCADE mode with automatic repeat capability.

It should be noted with reference to FIG. 21 that the ACK output between the cascaded transmitter bank and the transmitter host system, is two transmitters away from the transmitter operating in LOCAL mode, versus one transmitter away as shown in FIG. 5. Using the transmitter shown in FIG. 21A, versus the one in FIG. 5, for engaging in the strobe/acknowledge protocol with the host is what causes the SYNC pad between data strings to be eliminated when using the autorepeat feature.

The maximum length of a string without SYNC will be determined by the Bit Error Rate (BER) that the disclosed system can deliver, and the ability of the target system to tolerate these errors. The longer the disclosed system must operate without SYNC, the higher the likelihood that SYNC will be lost, data patterns will be shifted with respect to the symbol boundary, and outputs will be garbled.

This means that the host system should stop and let the transmitter insert SYNC after a long burst of data. This can be accomplished by waiting one byte time before strobing which will cause a SYNC to be inserted in the data stream.

Multibyte transfers can easily be made in autorepeat mode. For example, to go from a narrow pattern to a wide pattern (e.g. 16 to 64 bits, etc.), only requires that the transmitter host logic never allow a SYNC/pad symbol be generated until the wider pattern is finished.

Figure 22:
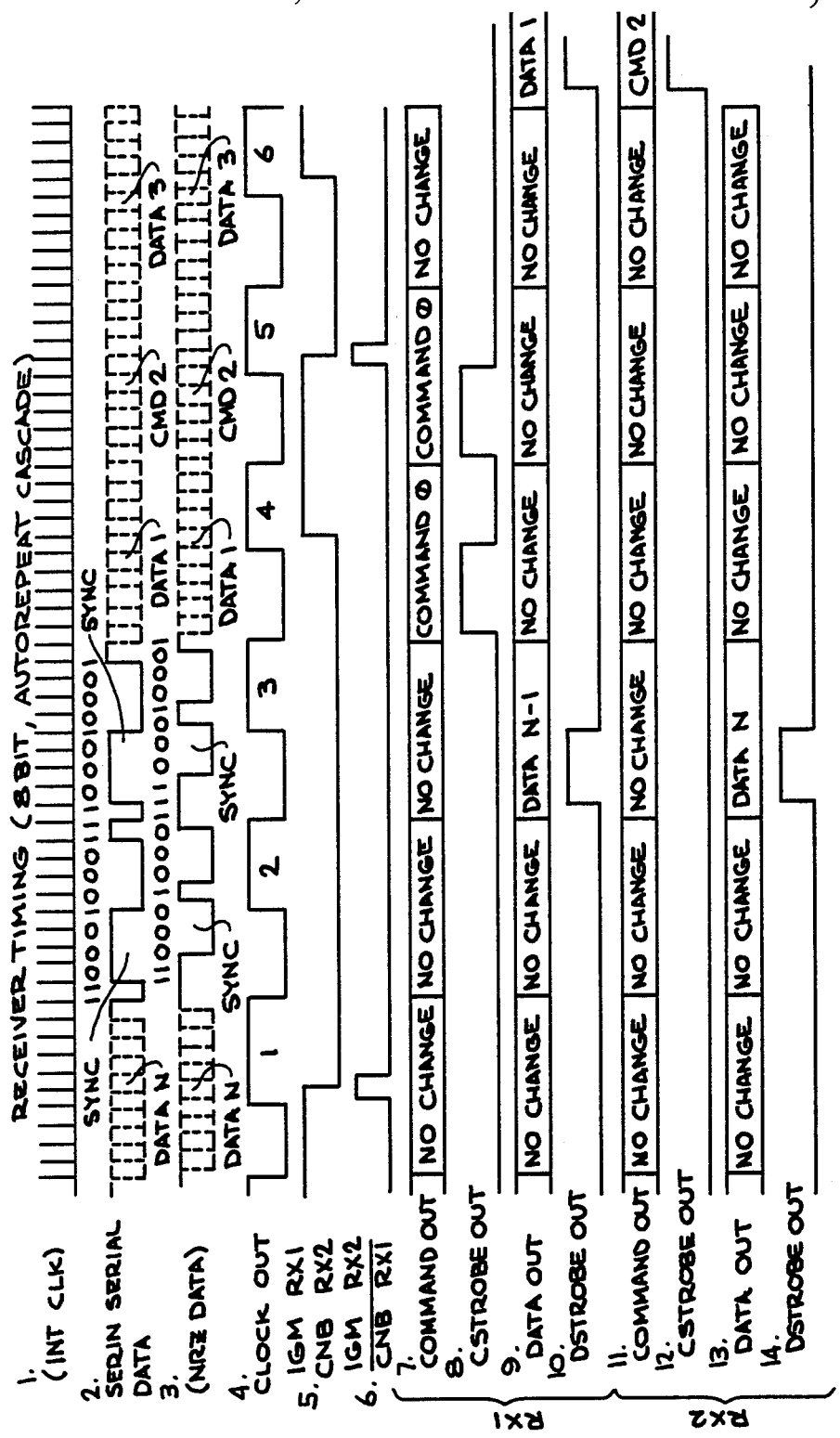
FIG. 22 is a timing diagram depicting the operation of an 8 bit receiver of a system, built in accordance with the teachings herein, operating in CASCADE mode and employing the automatic repeat feature.

FIG. 22 depicts a timing diagram useful for reviewing several important facets of the autorepeat feature. A two receiver model is used in the example.

Line 1 of FIG. 22 shows the internal clock. Line 2 shows the serial NRZI data input to the receiver. Line 3 shows corresponding NRZ data input to the shifter.

Line 4 represents the clock, with byte interval boundaries on the clock's falling edge.

During the first half of the first full byte interval shown, it is assumed that RX1 has its data (DATA N-1, not shown) since IGM for RX1 is high (line 5 of FIG. 22). Since IGM for RX1 is high, CNB for RX2 is high and therefore RX2 has permission to capture the next data byte, shown as DATA N.

In the second half of the first full byte interval depicted in FIG. 22, IGM for RX2 goes high (line 6 of FIG. 22). This causes the CNB input for RX1, which is defined to be the inverse of IGM for RX2 in autorepeat mode, to go low. This turn causes; (1) IGM for RX1 to fall (seen in line 5); (2) CNB for RX2 to fall (it's the same as IGM for RX1), and (3) IGM for RX2 itself to fall after being high for only the short period depicted.

As a result, at the start of byte interval 2, both are low, with RX1 authorized to capture data (it's CNB input is high).

DATA N is transferred from the shifter of RX2 to the decoder latch of RX2 at the byte 1/byte 2 boundary (falling edge of clock). At the byte 2/byte 3 boundary DATA N in RX2 and DATA N-1, already prepared for output by RX1, may be seen, with reference to lines 7-14 of FIG. 22, as being strobed out.

It should be noted that during byte intervals 2 and 3, the IGMs of RX1 and RX2 remain low since SYNCs are in the shifters and two "COMMAND 0", outputs, each representing a detected SYNC, are CSTROBED out from RX1 only (the only receiver allowed to catch a byte) during byte intervals 4 and 5 (see line 8).

The process of picking data off the transmission link begins again during byte interval 4 where the IGM of RX1 goes high, signifying RX1 has caught DATA 1, and during byte interval 5 when IGM 2 again briefly goes high to signal RX2 has caught CMD 2. These pieces of data, (DATA 1 and CMD 2) are shown output during byte interval 7, at the far right side of FIG. 22.

With the autorepeat feature in opertion, DATA 3 will be taken off the transmission media right after CMD 2 with no intervening SYNC. This can be seen with reference to line 5 of FIG. 22 which shows IGM 1 of RX1 again going high. Mid-byte 6, indicating RX1 has already caught DATA 3.

What has been described is a novel system which, according to its preferred embodiment, includes a semiconductor integrated circuit operative as a means for accepting and transmitting asynchronous nonhomogeneous variable width parallel data patterns serially in a format suitable for use with a synchronous high speed serial link.

The transmitter chip internally and automatically, was shown to switch between the nonhomogeneous data types eliminating the need for external multiplex devices and programming resources.

The system was further shown to include a semiconductor integrated circuit operative as a receiver, where the receiver accepts serial data from the link and is capable of reversing the process performed by the transmitter, i.e. the receiver is capable of internally, and automatically, demultiplexing and then outputting the nonhomogeneous variable width parallel data as originally input to the system. The receiver was further shown to identify output data by type.

The disclosed circuits were shown to be modular and cascadable so that a wide variety of parallel data patterns could be manipulated, transmitted and received, sharing a single serial interface. No bus controller arbitrators, software or switchable line drivers were required. Additionally, the disclosed system automatically synchronized itself between strings of user data without host system intervention. In fact, the disclosed system was shown to be virtually transparent to the user.

In short, the disclosed system meets the objectives set forth hereinbefore.

One skilled in the art will be able to appreciate many potential applications of the invention. A few examples are:

(1) high speed (asynchronous, or synchronous) control busses, typical of disk drive control busses, where data rates typically exceed 10 mBits/sec. and control interface may exceed 1 mBit/sec;

(2) extended distance parallel data transmission, typical of remote printers and terminals, where data is moved in packets at a rate higher than 10–20 mBaud;

(3) industrial equipment control and data communications systems, where electrical and magnetic interference make communications difficult using typical metallic interconnect (the disclosed system facilitates a high speed fiber optic interface);

(4) robotic control signalling, and feedback. Any highspeed feedback control system, where many conditions must communicate a high rate, and through a minimum of signal wires (typical of a robotic arm);

(5) building blocks for nonstandard networks, equivalent to FDDI, typical of the new serial busses on desktop PCs;

(6) high speed control busses, where interconnect hardware is critical, or expensive. This is typical of military and avionics control systems;

(7) low to medium speed data acquisition (less than 110 ns. per parallel sample output); and (8) any system where parallel data or control signals are now transported between cabinets or cards, using ribbon cable or a PC backplane. These communication channels are typically not well enough structured to be supported by the standard LAN conventions. Data is often generated, and transported between nonintelligent portions of a system and cannot support the protocol required by FDDI systems.

The foregoing description of a preferred embodiment of a novel receiver device and receiver configurations employing such devices has been presented for purposes of illustration and description. It is not intended to be exhaustive or to limit the invention to the precise form disclosed, and obviously many modifications and variations are possible in light of the above teaching. The embodiment was chosen and described in order to best explain the principles of the instant invention and its practical application to thereby enable others skilled in the art to best utilize the instant invention in various embodiments and with various modifications as are suited to the particular use contemplated. It is intended that the scope of the instant invention be defined by the claims appended thereto.

I claim:

1. Apparatus for converting serial data pattern signals, representative of asynchronous nonhomogeneous variable width parallel data pattern input signals and received over a synchronous serial transmission media, to parallel data pattern output signals which correspond to said input signals, including at least one receiver device wherein each such device comprises:
    (a) means, including a first storage means, for capturing synchronously transmitted encoded data patterns from said media;
    (b) second means, including data decoding means and demultiplexing means, for decoding and demultiplexing the input represented by a given captured data pattern and generating the parallel data pattern output corresponding thereto; and
    (c) third means, including parallel output means, for enabling the output of said parallel data pattern output signals.

2. Apparatus as set forth in claim 1 wherein said first means of each receiver device is authorized and enabled to capture a transmitted data pattern only in response to the presence of a catch authorization signal input to the device.

3. Apparatus as set forth in claim 2 wherein said first means of each receiver device is further operable to generate a signal indicating the capture of data.

4. Apparatus as set forth in claim 3 wherein said first means of each receiver device is further operable to generate clock pulses for the internal synchronization of each receiver.

5. Apparatus as set forth in claim 4 wherein said first means of each receiver device is further operable to output clock pulses suitable for synchronizing the operation of external devices with the operation of a given receiver.

6. Apparatus as set forth in claim 5 wherein the output clock pulses from a given device may optionally serve as said catch authorization signal for said device.

7. Apparatus as set forth in claim 1 wherein said second means of each receiver device is further operable to identify the type of nonhomogeneous data input represented by the destination oriented content of a given data pattern.

8. Apparatus as set forth in claim 7 wherein said second means of each receiver device is further operable to identify said parallel data pattern outputs by destination oriented content type.

9. Apparatus as set forth in claim 1 wherein said second means of each receiver device is further operable in response to a second selected control signal indicative of data width, to decode each of said captured patterns as a function of the data width indicated.

10. Apparatus as set forth in claim 1 which said first means of each receiver device includes a phase locked data recovery loop for separating said transmitted encoded data patterns into separate clock and data pattern streams.

11. Apparatus as set forth in claim 10 in which said phase locked recovery loop includes a phase detector that ignores missing pulses.

12. Apparatus as set forth in claim 10 in which said phase locked recovery loop incorporates a master/slave oscillator arrangement.

13. Apparatus as set forth in claim 10 in which said phase locked recovery loop operates at the bit rate of said separated clock stream.

14. Apparatus as set forth in claim 10 wherein said first means further includes a clock generator for supplying a center frequency signal to said phase locked recovery loop.

15. Apparatus as set forth in claim 14 wherein said clock generator further comprises:
    (a) a master frequency source;
    (b) a phase locked loop connected to said master frequency source; and
    (c) a master counter connected to said phase locked loop, for outputting said center frequency signal to said recovery loop.

16. Apparatus as set forth in claim 15 wherein said master frequency source is a crystal oscillator.

17. Apparatus as set forth in claim 3 which includes a plurality of said receiver devices in which the signal indicating the capture of data by a first one of said plurality of devices is used as the catch authorization signal for a second one of said plurality of devices.

18. Apparatus as set forth in claim 17 wherein each of said receiver devices in a cascaded chain of said devices, synchronously enables the output of captured data upon the detection of a transmitted synchronization pattern from said media.

19. Apparatus as set forth in claim 18 in which the inverted output of the farthest downstream receiver device in a cascaded chain serves as the catch authorization signal for the farthest upstream receiver device in said chain and further in which each device in said chain enables the output of captured data in response to the capture of data by the farthest downstream receiver.

20. Apparatus as set forth in claim 1 wherein the width of said parallel data pattern outputs is variable as a function of the number of said receiver devices.

21. Apparatus as set forth in claim 1 wherein each of said receiver devices is a single semiconductor integrated circuit device.

22. A method for converting serial data pattern signals, representative of asynchronous nonhomogeneous variable width parallel data pattern input signals and received over a synchronous serial transmission media, to parallel data pattern output signals which correspond to said input signals, comprising the steps of:
    (a) capturing said serial data pattern signals off of said transmission media;
    (b) decoding the input represented by a given captured data pattern;
    (c) demultiplexing said decoded data;

(d) generating the parallel data pattern output corresponding to a given input signal;
(e) enabling the output from the system of said parallel data pattern outputs; and
(f) outputting said parallel data pattern outputs as enabled.

23. A method as set forth in claim 22 wherein said step of generating the parallel data pattern further includes the step of identifying the type of nonhomogeneous data input represented by the destination oriented content of a captured data pattern.

24. A method as set forth in claim 22 wherein said step of decoding is performed as a function of the data width of the captured data.

25. A method as set forth in claim 22 which said step of capturing further includes the step of separating said transmitted data patterns into separate clock and data pattern streams.

26. A method as set forth in claim 25 in which said step of separating clock and data patterns ignores missing clock pulses.

* * * * *